US011353966B1

(12) United States Patent
Ebert

(10) Patent No.: US 11,353,966 B1
(45) Date of Patent: Jun. 7, 2022

(54) HANDHELD CONTROLLERS AND ARTIFICIAL-REALITY SYSTEMS

(71) Applicant: Facebook Technologies, LLC, Menlo Park, CA (US)

(72) Inventor: Ryan Michael Ebert, Issaquah, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/725,370

(22) Filed: Dec. 23, 2019

(51) Int. Cl.
*G06F 3/0338* (2013.01)
*G06F 3/01* (2006.01)
*G06T 19/00* (2011.01)

(52) U.S. Cl.
CPC .......... *G06F 3/0338* (2013.01); *G06F 3/011* (2013.01); *G06F 3/016* (2013.01); *G06T 19/006* (2013.01)

(58) Field of Classification Search
None
See application file for complete search history.

(56) References Cited

U.S. PATENT DOCUMENTS

| 4,905,001 | A | * | 2/1990 | Penner | G06F 3/014 340/407.1 |
| 2001/0043847 | A1 | * | 11/2001 | Kramer | G06F 3/014 414/5 |
| 2017/0031443 | A1 | * | 2/2017 | Nakamura | G10K 15/04 |
| 2018/0284896 | A1 | * | 10/2018 | Kearney | G06F 3/014 |
| 2019/0380802 | A1 | * | 12/2019 | Savall | G06F 3/0346 |
| 2020/0237467 | A1 | * | 7/2020 | Savall | G06F 3/017 |

FOREIGN PATENT DOCUMENTS

AU   2016102467 A4 *  7/2021  .......... A61F 2/583

\* cited by examiner

*Primary Examiner* — James A Thompson
(74) *Attorney, Agent, or Firm* — FisherBroyles, LLP

(57) ABSTRACT

The disclosed handheld controllers may include at least one finger force-feedback mechanism. The finger force-feedback mechanism may include a rotational element positioned to have an axis of rotation that is located along a palm side of a finger of an intended user's hand when holding the handheld controller, a proximal linkage element positioned and configured to rotate with the intended user's finger about the major knuckle when the user squeezes the handheld controller, and a distal linkage element positioned and configured to rotate relative to the proximal linkage element with the intended user's finger about the second knuckle when the user squeezes the handheld controller. Various other handheld controllers, artificial-reality systems, and methods are also disclosed.

17 Claims, 21 Drawing Sheets

HANDHELD CONTROLLERS AND ARTIFICIAL-REALITY SYSTEMS

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
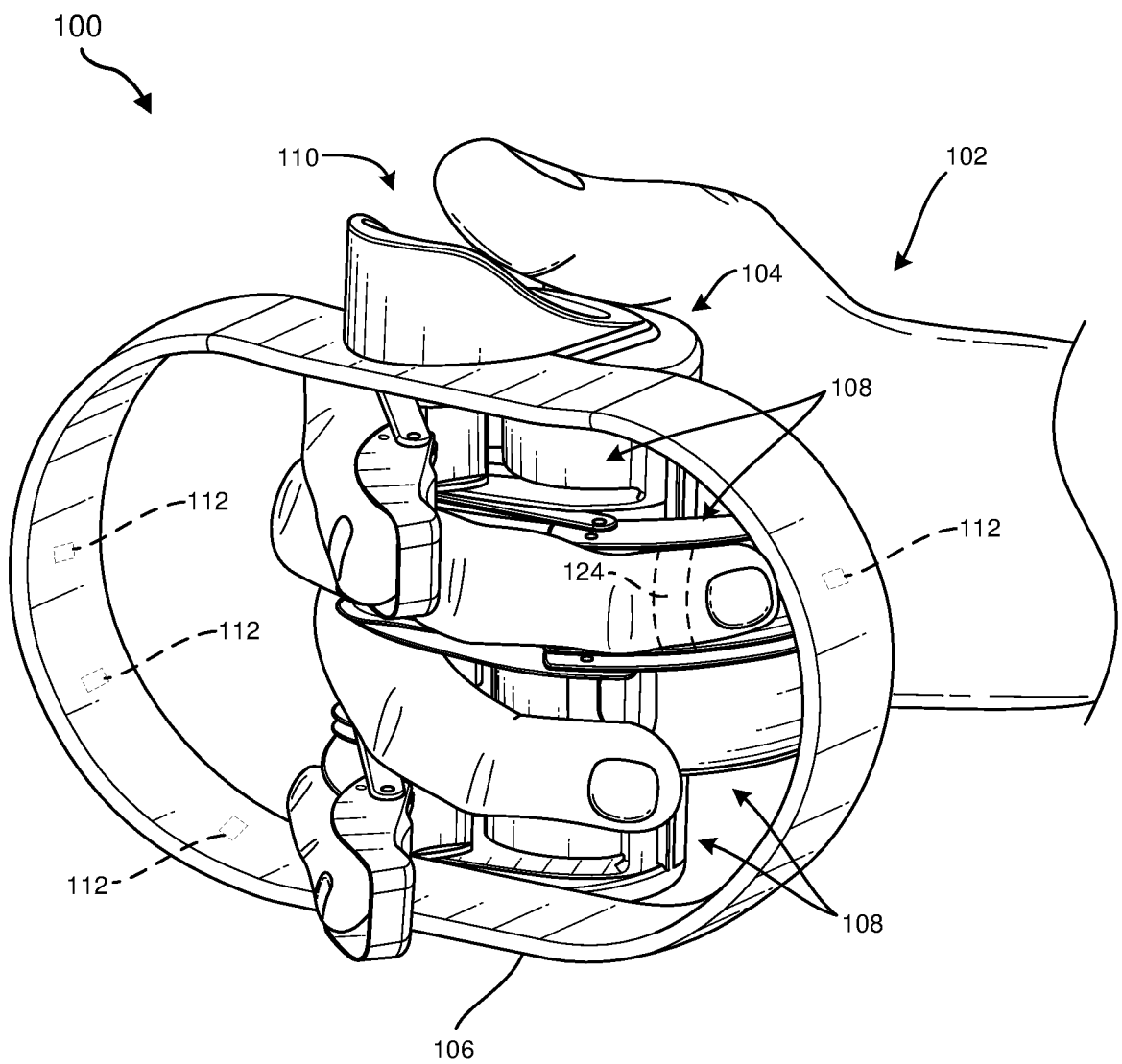
FIG. 1 is a perspective view of a handheld controller being held by a user's hand, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Artificial-reality systems, such as virtual-reality systems and augmented-reality systems, typically display computer-generated content (often via a head-mounted display ("HMD")) to users in order to create immersive experiences. For example, a virtual-reality system may create three-dimensional ("3D") renderings to simulate an environment or a virtual space. Alternatively, augmented-reality systems may merge computer-generated content with a user's view of a real-world environment to enhance interactions with the real-world environment. These systems may provide users with the ability to navigate and alter digital content that may provide helpful information about real-world objects.

Some artificial-reality systems include handheld controllers that may be configured for a user to interact with content generated by the artificial-reality systems and displayed on an HMD. For example, a user may interact with a computer-generated object or image by reaching with the handheld controller in 3D space toward a perceived location of the object or image. The artificial-reality system may track the location and/or orientation of the handheld controller, such as optically and/or with the use of various sensors (e.g., a position sensor, an accelerometer, a gyroscope, a magnetometer, an inertial measurement unit ("IMU"), etc.). In addition, the user may interact with computer-generated content by manipulating one or more input elements on the handheld controller, such as a trigger, a button, a touch-sensitive pad, a joystick (e.g., a thumbstick), etc. When the user perceives to touch or otherwise interact with the computer-generated content, the handheld controller may provide haptic feedback to the user, often through vibration.

Some handheld or hand-worn controllers may include force-feedback mechanisms to provide haptic feedback to the user. Force-feedback mechanisms often include motors that are configured to provide a sensation of movement and/or braking to simulate interaction with a real-world object or surface. For example, some gloves for use with artificial-reality systems may include an elongated band along a back side of the user's finger that is attached to a fingertip structure. The band may be tightened or stopped by a motor or other suitable mechanism to provide a sensation of the user's fingertip pressing against a real-world object. This action may be synchronized with the user's interaction with a virtual object to provide a physical feeling of pressing against or touching the virtual object. While such force-feedback mechanisms have been employed to enhance the immersiveness of some artificial-reality experiences, conventional handheld controllers that provide force feedback are often bulky, heavy, and/or complicated to manufacture and wear.

The present disclosure is generally directed to handheld controllers, artificial-reality systems, and methods that may provide force feedback to a user. As will be explained in further detail below, handheld controllers according to some embodiments may include a rotational element (e.g., a motor, a brake, a clutch, etc.) positioned to have an axis of rotation that is located along a palm side of a finger of an intended user's hand when holding the handheld controller. A proximal linkage element may be positioned and configured to rotate with the intended user's finger about the major knuckle when the user squeezes the handheld controller. A distal linkage element may be positioned and configured to rotate relative to the proximal linkage element with the intended user's finger about the second knuckle when the user squeezes the handheld controller. Such handheld controllers may be relatively compact and easy to manufacture and use compared to some conventional controllers with force feedback.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
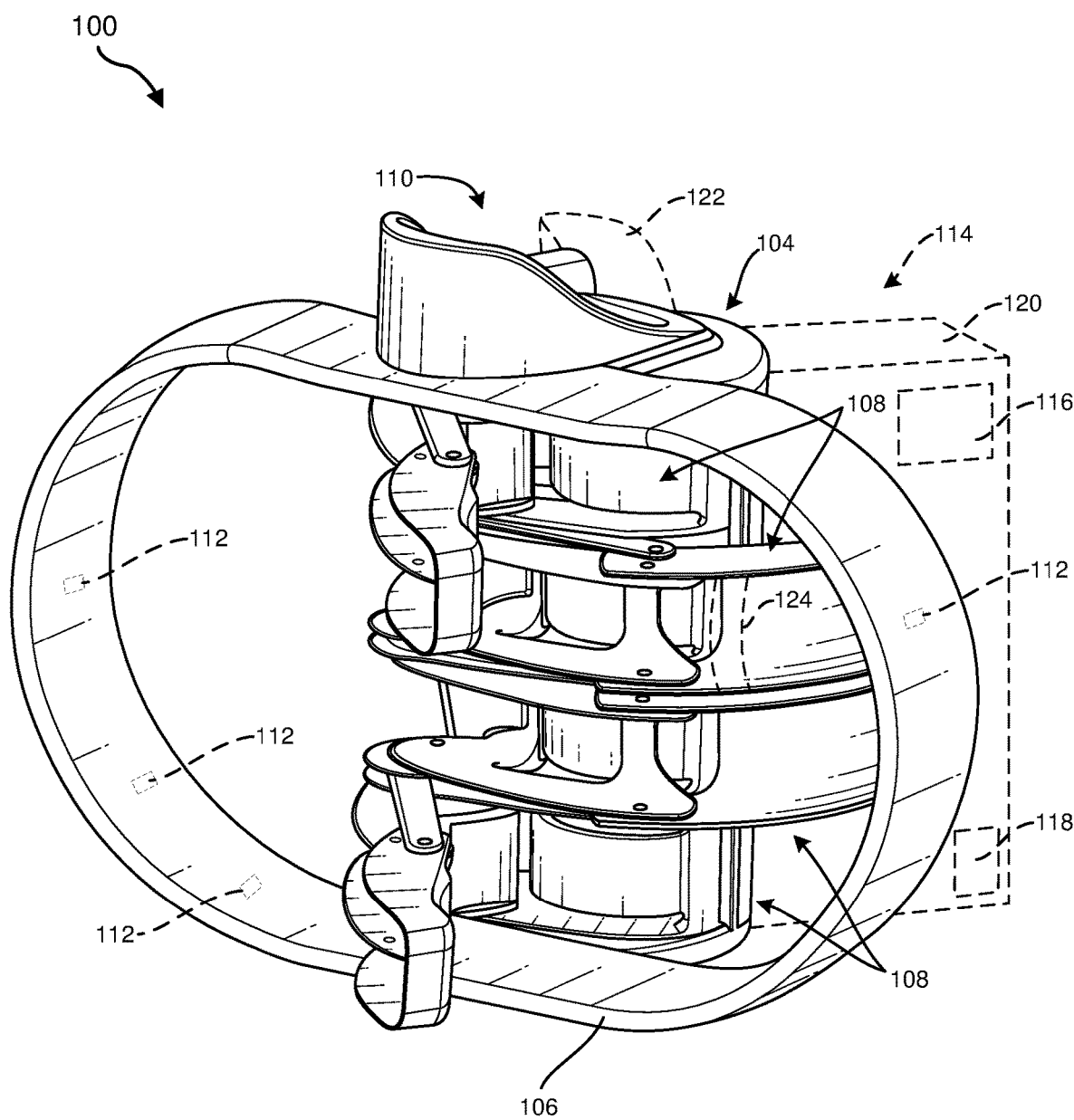
FIG. 2 is another perspective view of the handheld controller of FIG. 1.
Figure 15:
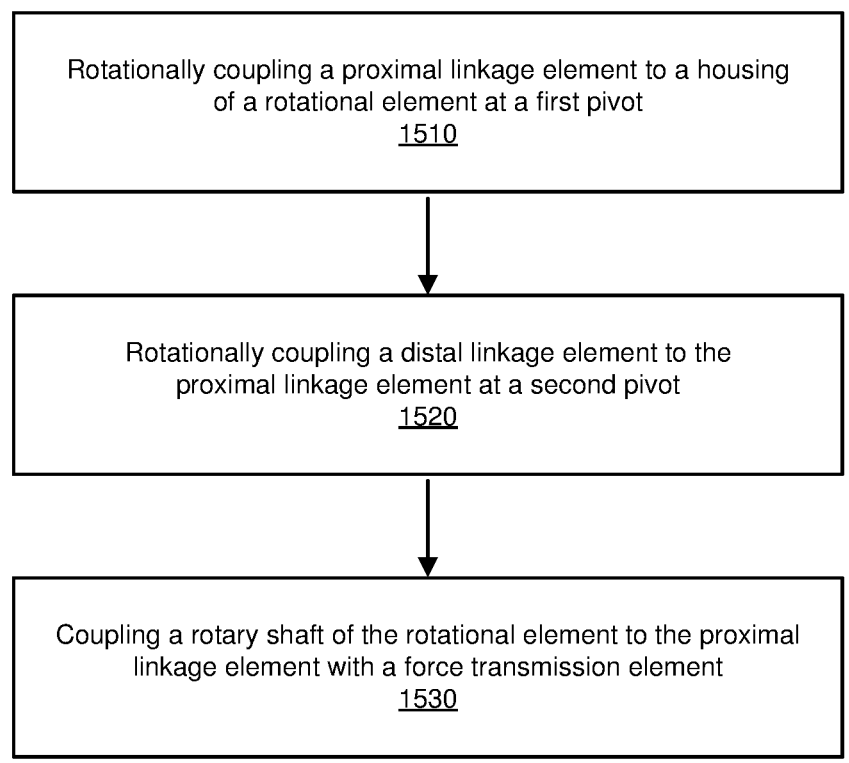
FIG. 15 is a flow diagram of an example method for fabricating a handheld controller, according to at least one embodiment of the present disclosure.
Figure 16:
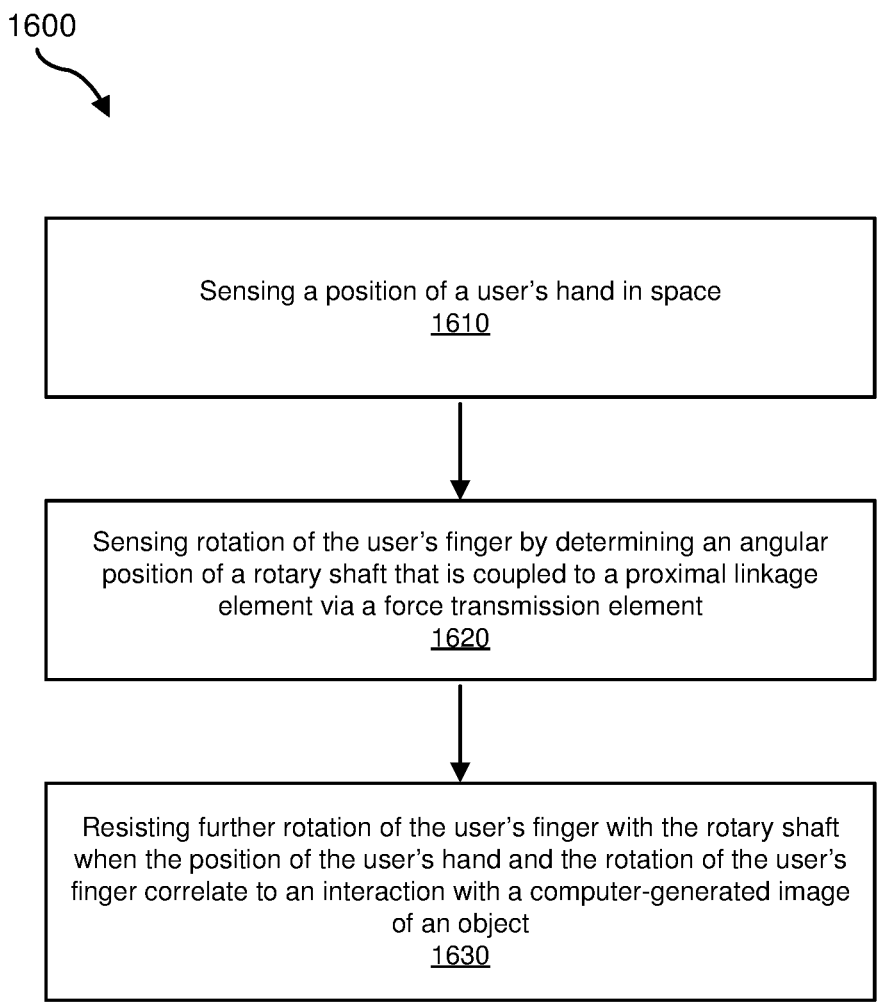
FIG. 16 is a flow diagram of an example method for operating a handheld controller, according to at least one embodiment of the present disclosure.

The following will provide, with reference to FIGS. 1 and 2, detailed descriptions of handheld controllers, such as for use with artificial-reality systems. With reference to FIGS. 3A-14, the following will provide detailed descriptions of various finger force-feedback mechanisms that may be employed in handheld controllers. With reference to FIG. 15, the following will provide detailed descriptions of methods for fabricating handheld controllers. With reference to FIG. 16, the following will provide detailed descriptions of methods for operating handheld controllers. With reference to FIGS. 17-21, the following will provide detailed descriptions of various artificial-reality systems and components that may implement embodiments of the present disclosure.

FIG. 1 is a perspective view of a handheld controller 100 being held by a user's hand 102, according to at least one embodiment of the present disclosure. FIG. 2 is another perspective view of the handheld controller 100 of FIG. 1 with the user's hand 102 omitted. Referring to FIGS. 1 and 2, the handheld controller 100 may include a central grip 104 that may be sized and shaped for grasping by the user's hand 102 and a tracking element 106. The central grip 104 may include finger force-feedback mechanisms 108 and a thumb input element 110. For example, there may be one respective finger force-feedback mechanism 108 for each of the index finger, middle finger, ring finger, and little finger, as shown in FIGS. 1 and 2. In other embodiments, the handheld controller 100 may include only one, two, or three finger force-feedback mechanisms 108. As shown in FIGS. 1 and 2, the finger force-feedback mechanisms 108 may be arranged in a stack. Each of the finger force-feedback mechanisms 108 may be configured to provide force feedback to the associated finger of the user's hand 102, as will be further explained below. In addition, each of the finger force-feedback mechanisms 108 may also be used to track a position of each finger of the user's hand 102, such as by using a rotary encoder, as will be explained in further detail below.

In some examples, the phrase "force feedback" may refer to actively applying a force (e.g., from a motor or other actuator) or to inhibiting (e.g., blocking, slowing) motion to counteract a force applied by a user.

In some embodiments, the thumb input element 110 may also be configured to provide force feedback to the user's thumb. For example, the thumb input element 110 may include a button, lever, and/or thumbstick that may be coupled to an actuator or brake mechanism to selectively provide resistance against pushing by the thumb and/or to actively push against the thumb. In further examples, the thumb input element 110 may be configured like the finger force-feedback mechanisms 108, and may be configured to have one or more degrees-of-freedom, such as by constraining movement of the thumb input element 110 to rotation about one or more axes.

The tracking element 106 may be configured for tracking the handheld controller 100 in 3D space, such as optically. By way of example and not limitation, the tracking element 106 may be generally ring-shaped, as illustrated in FIGS. 1 and 2. The tracking element 106 may be positioned on the handheld controller 100 to at least partially surround a portion of the user's hand 102 (e.g., the fingers) when the handheld controller 100 is held. In additional embodiments, the tracking element 106 may be in a different position, such as to extend over a top of the central grip 104 (e.g., over the user's thumb).

The tracking element 106 may include one or more features to facilitate optical tracking of the handheld controller 100. For example, the shape of the tracking element 106 may be a predetermined shape that one or more optical sensors (e.g., visible light cameras, infrared cameras, etc.) of an artificial-reality system (e.g., of an HMD, on a structure in a physical space to be used by the user, etc.) are configured to identify. In some embodiments, one or more optically identifiable elements 112 may be positioned on or in the tracking element 106. For example, the optically identifiable elements 112 may include shapes, colors, and/or patterns that can be identified by an artificial-reality system. The optically identifiable elements 112 may be arranged in a predetermined pattern to facilitate optical recognition of the position, orientation, and/or motion of the handheld controller 100. In some examples, one or more of the optically identifiable elements 112 may include an active (e.g., electrically powered) element, such as a light-emitting diode (e.g., an infrared or visible light LED) or an optical sensor (e.g., a visible light or infrared camera).

As illustrated in FIG. 2 in dashed lines, in some embodiments, the finger force-feedback mechanisms 108 and other components of the handheld controller 100 may be powered and controlled by a power and control module 114. The power and control module may include an electrical power source 116 (e.g., a battery, a wired power source, etc.), a computer control subsystem 118 (e.g., a processor, etc.), and a module housing 120 for containing the electrical power source 116 and the computer control subsystem 118. As shown in FIG. 2, in some embodiments the module housing 120 may be rigidly coupled to the central grip 104 of the handheld controller 100 and positioned to extend from the central grip 104 along the user's palm and/or wrist. However, in additional embodiments, the power and control module 114 (or one or more components thereof) may be positioned in a different location, such as to extend from a bottom (from the perspective of FIGS. 1 and 2) of the central grip 104. In further embodiments, the power and control module 114 (or one or more components thereof) may be positioned remotely from the central grip 104, such as on a wristband, an HMD, an armband, a sleeve, a glove (e.g., in a location to be positioned on a back of the user's hand 102), a neckband, and/or a computing device (e.g., a desktop computer, a laptop computer, a computer tablet, etc.). In this case, the power and control module 114 may be operatively connected to the finger force-feedback mechanisms 108, such as via an electrical cord.

In some embodiments, the handheld controller 100 may include at least one hand-coupling element that is configured to hold the user's hand 102 or a portion thereof against the handheld controller 100. For example, the handheld controller 100 may include a hand strap 122 that is configured to extend from a top of the central grip 104, around a back of the user's hand 102, and to the bottom of the central grip 104 to hold the central grip 104 within a palm of the user's hand 102 even when the fingers are not actively gripping the central grip 104. Similarly, one or more finger straps 124 may be positioned and configured to hold the user's fingers against the finger force-feedback mechanisms 108 to maintain engagement between the fingers and the finger force-feedback mechanisms 108 even when the fingers are not actively gripping the central grip 104. Likewise, in some embodiments, the handheld controller 100 may be integrated with a glove into which the user's hand 102 may be inserted to maintain engagement of the user's hand 102 and fingers with the handheld controller 100.

Figure 3A:
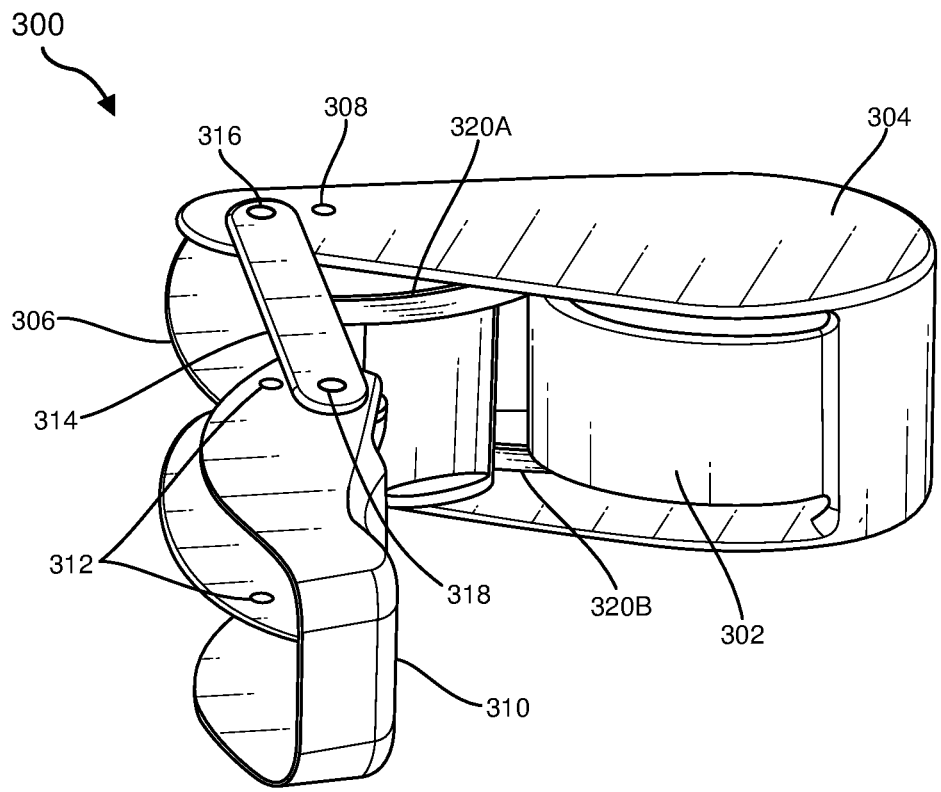
FIG. 3A is a perspective view of a finger force-feedback mechanism, according to at least one embodiment of the present disclosure.
Figure 3B:
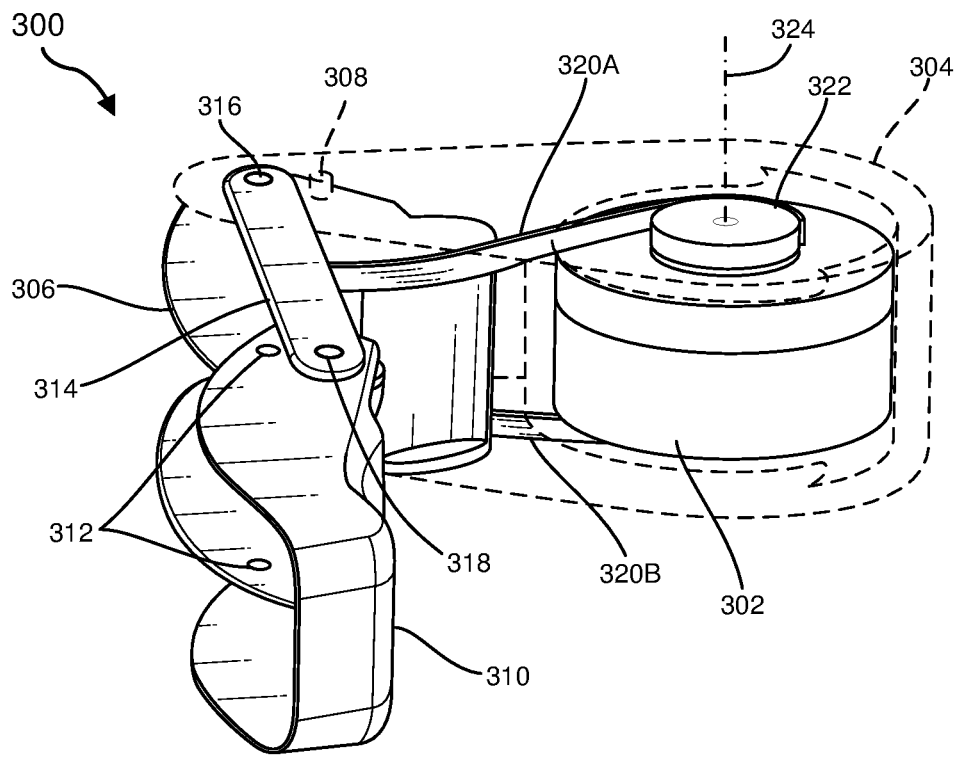
FIG. 3B is a perspective view of the finger force-feedback mechanism of FIG. 3A with certain components shown as transparent to view underlying components.
Figure 4A:
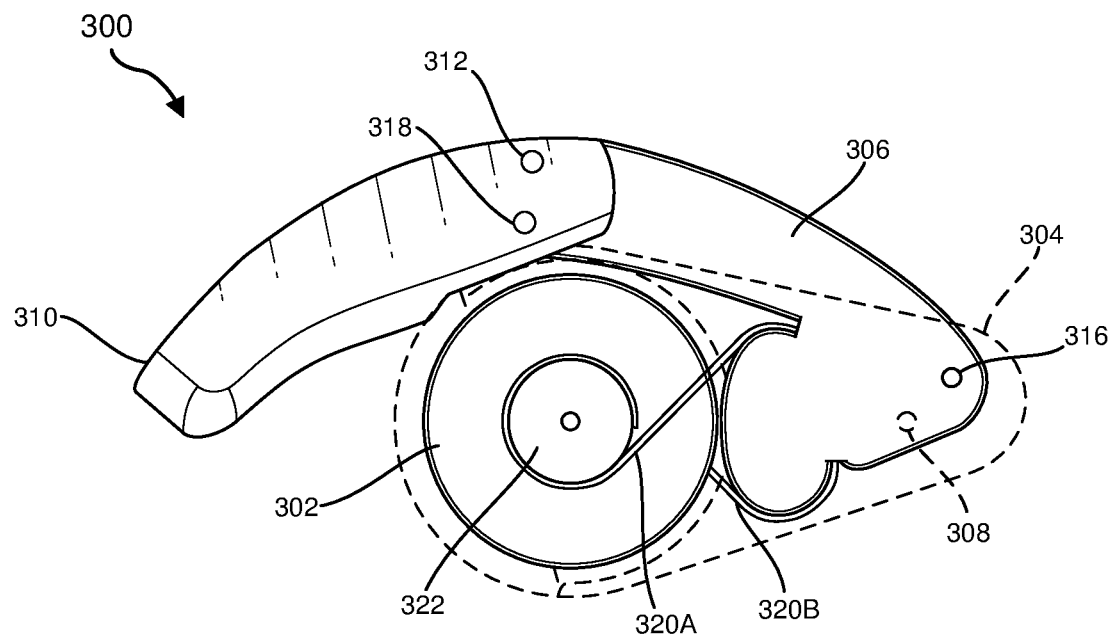
FIGS. 4A and 4B are top views of the finger force-feedback mechanism of FIGS. 3A and 3B respectively in closed and open positions.
Figure 4B:
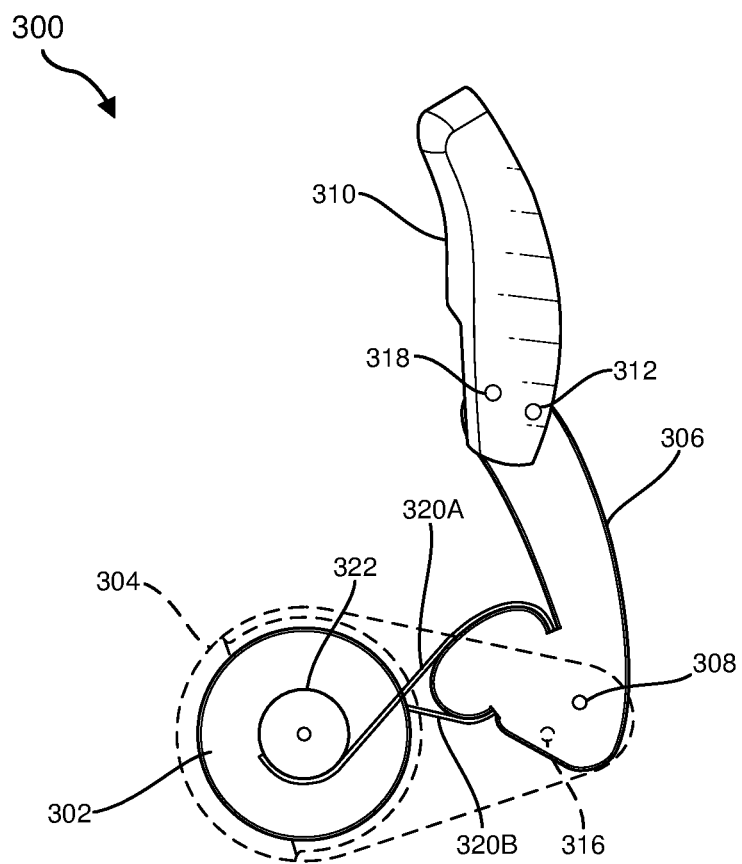
Figure 5A:
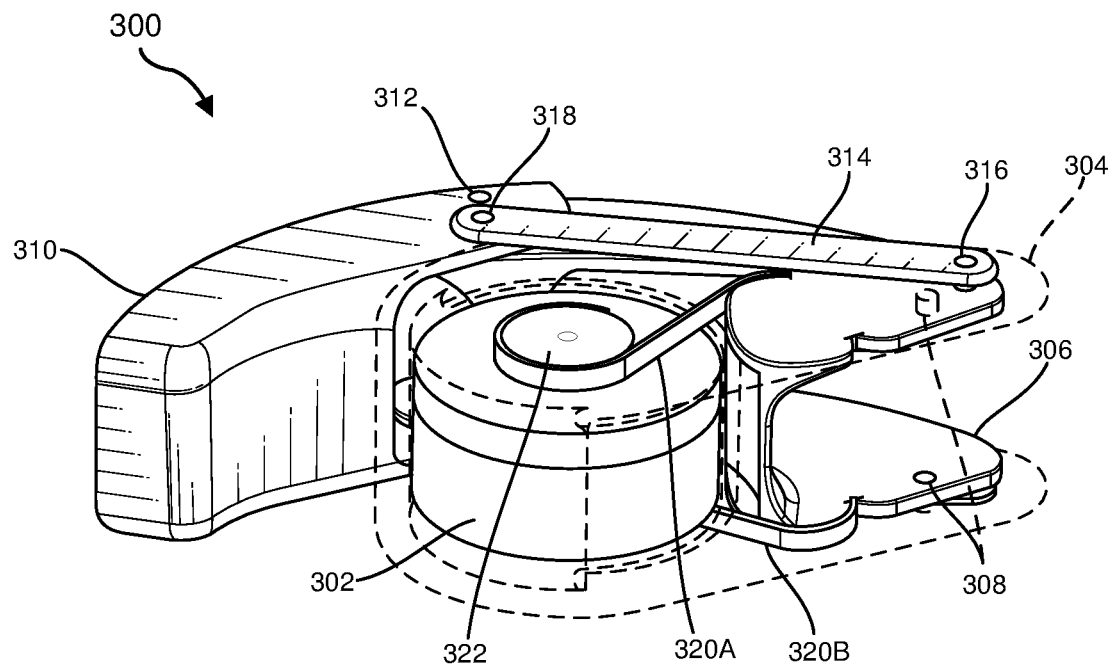
FIGS. 5A and 5B are perspective views of the finger force-feedback mechanism of FIGS. 3A and 3B respectively in closed and open positions.
Figure 5B:
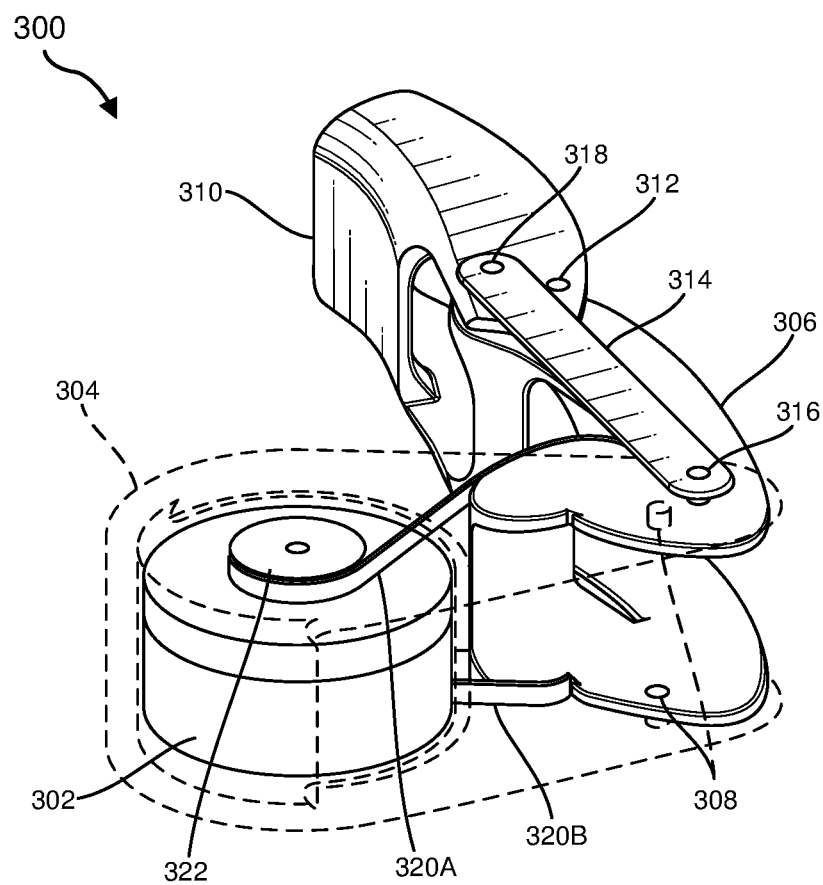

FIG. 3A is a perspective view of a finger force-feedback mechanism 300, according to at least one embodiment of the present disclosure. FIG. 3B is a perspective view of the finger force-feedback mechanism 300 with certain components shown as transparent to more clearly view underlying elements and features. FIGS. 4A and 4B are top views of the finger force-feedback mechanism 300 respectively in closed and open positions, with certain components shown as transparent to more clearly view underlying elements and features. FIGS. 5A and 5B are perspective views of the finger force-feedback mechanism 300 respectively in closed and open positions, with certain components shown as transparent to more clearly view underlying elements and features. The finger force-feedback mechanism 300 may be used as each of the finger force-feedback mechanisms 108 of the handheld controller 100, as described above.

Referring to FIGS. 3A-5B, the finger force-feedback mechanism 300 may include a rotational element 302, a central housing 304 that supports the rotational element 302, a proximal linkage element 306 rotationally coupled to the central housing 304 at a first pivot 308, and a distal linkage element 310 rotationally coupled to the proximal linkage element 306 at a second pivot 312. In some embodiments, a first end portion of a rigid bar 314 (see FIGS. 3A, 3B, 5A, and 5B) may be rotationally coupled to the central housing 304 at a third pivot 316 that is in a different position from the first pivot 308. A second end portion of the rigid bar 314 may also be rotationally coupled to the distal linkage element 310 at a fourth pivot 318 that is in a different position from the second pivot 312.

In some examples, relational terms, such as "first," "second," "upper," "lower," etc., may be used for clarity and convenience in understanding the disclosure and accompanying drawings and does not connote or depend on any specific preference, orientation, or order, except where the context clearly indicates otherwise.

In embodiments in which the rigid bar 314 is present, the rigid bar 314 may constrain the rotation of the distal linkage element 310 relative to rotation of the proximal linkage element 306. Thus, rotation of the distal linkage element 310 may be dependent on rotation of the proximal linkage element 306 due to the rigid bar 314, resulting in a one degree-of-freedom finger force-feedback mechanism 300. In embodiments in which the rigid bar 314 is omitted, rotation of the distal linkage element 310 may be at least partially independent from rotation of the proximal linkage element 306. In this case, the finger force-feedback mechanism 300 may have two degrees-of-freedom.

In some examples, the finger force-feedback mechanism 300 may also include one or more elongated force transmission elements 320A, 320B that may be positioned and configured to transmit a force between the proximal linkage element 306 and a rotary shaft 322 of the rotational element 302. For example, an upper force transmission element 320A may be coupled to and extend between an upper portion of the rotary shaft 322 and the proximal linkage element 306 and a lower force transmission element 320B may be coupled to and extend between a lower portion of the rotary shaft 322 and the proximal linkage element 306. In this example, the rotary shaft 322 may extend upward and downward (from the perspective of FIGS. 3A and 3B, for example) to enable the upper and lower force transmission elements 320A, 320B to be coupled to the rotary shaft 322. The upper force transmission element 320A and the lower transmission element 320B are collectively referred to herein as "force transmission elements 320." By way of example and not limitation, the force transmission elements 320 may be clamped, welded, or molded to the rotary shaft 322 and to the proximal linkage element 306. The force transmission elements 320 may, in some embodiments, be placed in tension to ensure a direct correlation between rotation of the proximal linkage element 306 and rotation of the rotary shaft 322.

The rotational element 302 may be or include at least one of a motor, a rotary encoder, a brake, and/or a clutch. In embodiments in which the rotational element 302 includes a motor, the motor may be activated during use to provide a force against the proximal linkage element 306 through one or both of the force transmission elements 320. For example, when the user presses against the proximal linkage element 306, the motor may be activated in a rotational direction to push back against the proximal linkage element 306 through the lower force transmission element 320B. Alternatively, the motor may be activated in an opposite rotational direction to make the proximal linkage element 306 collapse via the upper force transmission element 320A. The motor may be a brushed motor, a brushless motor, a stepper motor, a gimbal motor, or another suitable motor.

In embodiments in which the rotational element 302 includes a rotary encoder, the rotary encoder may be used to determine a rotational position of the rotational element 302. The rotational position of the rotational element 302 may be used to determine a position of the proximal linkage element 306. If the finger force-feedback mechanism 300 has a single degree-of-freedom (e.g., the position of the distal linkage element 310 is fully dependent on the position of the proximal linkage element 306), then the rotational position of the rotational element 302 may also be used to determine a position of the distal linkage element 310. The determined position of the proximal linkage element 306 and/or of the distal linkage element 310 may be used by an artificial-reality system to display corresponding content, such as to display a virtual finger or tool that is in a computer-generated position corresponding to the determined position. In addition, the artificial-reality system may use the determined position to determine when it may be appropriate to provide force feedback to the user, such as when the user interacts with a virtual object or performs an action for which feedback may be desired.

In embodiments in which the rotational element 302 includes a brake, the brake may be activated to cause the proximal linkage element 306 to stop (e.g., through the force transmission element(s) 320) or to provide resistance against further movement. For example, when the user grasps a virtual object displayed by an artificial-reality system, the brake may be activated to provide a sensation that the user is physically grasping a real object.

In embodiments in which the rotational element 302 includes a clutch, the clutch may be activated to engage a rotating element with a stationary element to provide various levels of mechanical feedback.

Additionally or alternatively, force feedback may be provided with a hydraulic actuator, a pneumatic actuator, a piezoelectric actuator, an electrostatic actuator, or any other suitable actuator or brake mechanism.

The central housing 304, proximal linkage element 306, distal linkage element 310, and rigid bar 314 (if present) may each be formed from a rigid material. For example, these components may include a hard plastic material, a metal material, a composite material (e.g., a fiber-matrix composite material), or any combination thereof.

As can be seen in FIGS. 3A, 3B, 5A, and 5B, the proximal linkage element 306 and the distal linkage element 310 may be contoured for receiving parts of the corresponding user's finger. For example, the proximal linkage element 306 and the distal linkage element 310 may be concave so that the user can position the corresponding finger at least partially within the proximal linkage element 306 and the distal linkage element 310. The length of the proximal linkage element 306 may be selected to correspond to a length of the user's proximal phalange. The length of the distal linkage element 310 may be selected to correspond to a combined length of the user's intermediate and distal phalanges. In some embodiments, since different users may have different hand and finger sizes, the lengths of the proximal linkage element 306 and distal linkage element 310 may be selected to fit a range of user's fingers (e.g., a small, medium, and large controller may be available having respectively small, medium, and large finger force-feedback mechanisms 300). In some examples, the different finger force-feedback mechanisms 300 of a single controller may have different sizes, such as to accommodate the different finger sizes on a single user's hand. Additionally, the position of one or more of the pivots 308, 312, 316, and 318 may be adjustable to accommodate different finger sizes. In some embodiments, the proximal linkage element 306 and/or the distal linkage element 310 may be spring-biased toward an open position to provide some resistance against grasping and to maintain engagement with the user's finger.

Referring to FIGS. 3A-5B in conjunction with FIGS. 1 and 2, a plurality of the finger force-feedback mechanisms 108, 300 may be stacked in the handheld controller 100. The rotational elements 302 of the finger force-feedback mechanisms 108, 300 may each have an axis of rotation 324 (see FIG. 3B). The axes of rotation 324 of the various finger force-feedback mechanisms 108, 300 may be positioned in the handheld controller 100 to be on a palm-side of the user's hand 102 when the handheld controller 100 is gripped by the user's hand 102. In some embodiments, the axes of rotation 324 of each rotational element 302 in the respective finger force-feedback mechanisms 108, 300 may be aligned with (e.g., collinear with) each other, as illustrated in FIGS. 1 and 2. In additional embodiments, one or more of the finger force-feedback mechanisms 108, 300 may be positioned to be offset from the other finger force-feedback mechanisms 108, 300, such that the axes of rotation 324 of the various rotational elements 302 may be parallel to, but not necessarily collinear with, each other.

Figure 6:
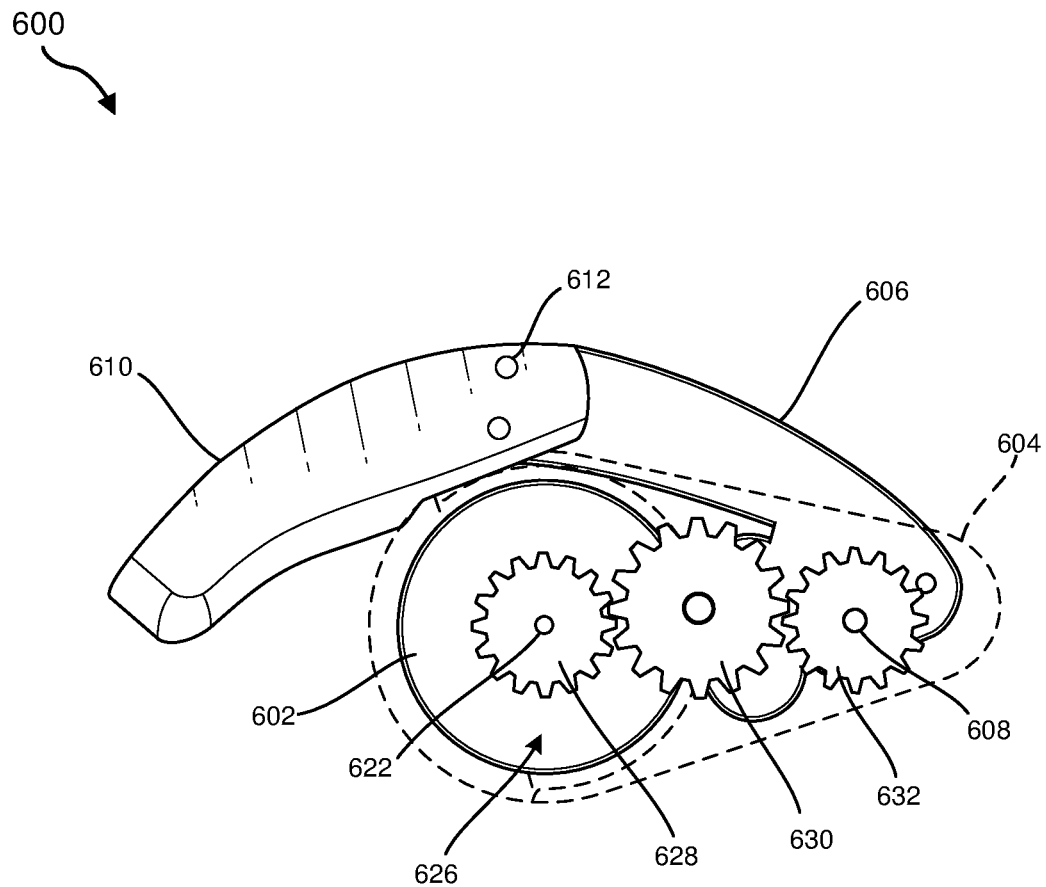
FIG. 6 is a top view of a finger force-feedback mechanism, according to at least one additional embodiment of the present disclosure.

FIG. 6 is a top view of a finger force-feedback mechanism 600, according to at least one additional embodiment of the present disclosure. The finger force-feedback mechanism 600 may, in some respects, be similar to the finger force-feedback mechanism 300 described above. For example, the finger force-feedback mechanism 600 may include a rotational element 602, a central housing 604, a proximal linkage element 606 rotationally coupled to the central housing 604 at a first pivot 608, and a distal linkage element 610 rotationally coupled to the proximal linkage element 606 at a second pivot 612. The rotational element 602 may include a rotary shaft 622. The finger force-feedback mechanism 600 may be used as one or more of the finger force-feedback mechanisms 108 of the handheld controller 100 described with reference to FIGS. 1 and 2. However, instead of using elongated force transmission elements 320 to transmit force between the rotary shaft 322 and the proximal linkage element 306 as described above with reference to FIGS. 3A-5B, the finger force-feedback mechanism 600 of FIG. 6 may include a gear train 626 that may be configured to transmit force between the rotary shaft 622 and the proximal linkage element 606.

The gear train 626 may include a drive gear 628 coupled to the rotary shaft 622 of the rotational element 602. An intermediate gear 630 may be intermeshed with the drive gear 628 and may be rotationally coupled to the central housing 604. A proximal linkage gear 632 may be intermeshed with the intermediate gear 630. The proximal linkage gear 632 may be coupled to the proximal linkage element 606 and may be rotatable about the first pivot 608. The diameters of the gears 628, 630, 632 may be adjusted to modify mechanical properties and performance of the finger force-feedback mechanism 600. For example, making the drive gear 628 smaller and/or making the intermediate gear 630 larger may enable the use of a relatively smaller rotational element 602 (e.g., motor, brake, clutch, etc.) while maintaining a level of force that may be transmitted between the rotational element 602 and the proximal linkage element 606. However, this example configuration may also induce a higher angular rotation of the rotary shaft 622 upon the same amount of rotation in the proximal linkage element 606.

Since the gear train 626 may be able to transmit force between the rotational element 602 in both rotational directions, in some examples the rotary shaft 622 may extend in only one direction (e.g., upward or downward) from the rotational element 602.

Although the gear train 626 is illustrated in FIG. 6 as including three gears 628, 630, 632, the present disclosure is not so limited. For example, the gear train 626 may include two gears, three gears, four gears, or any other number of gears. In addition, in some embodiments the rotary shaft 622 may be or include a gear, and the proximal linkage element 606 may have an integral gear portion intermeshed directly with the gear of the rotary shaft 622, without the intermediate gear 630. Moreover, different types of gears may be employed, such as rack-and-pinion gears, spur gears, bevel gears, worm gears, etc.

Figure 7A:
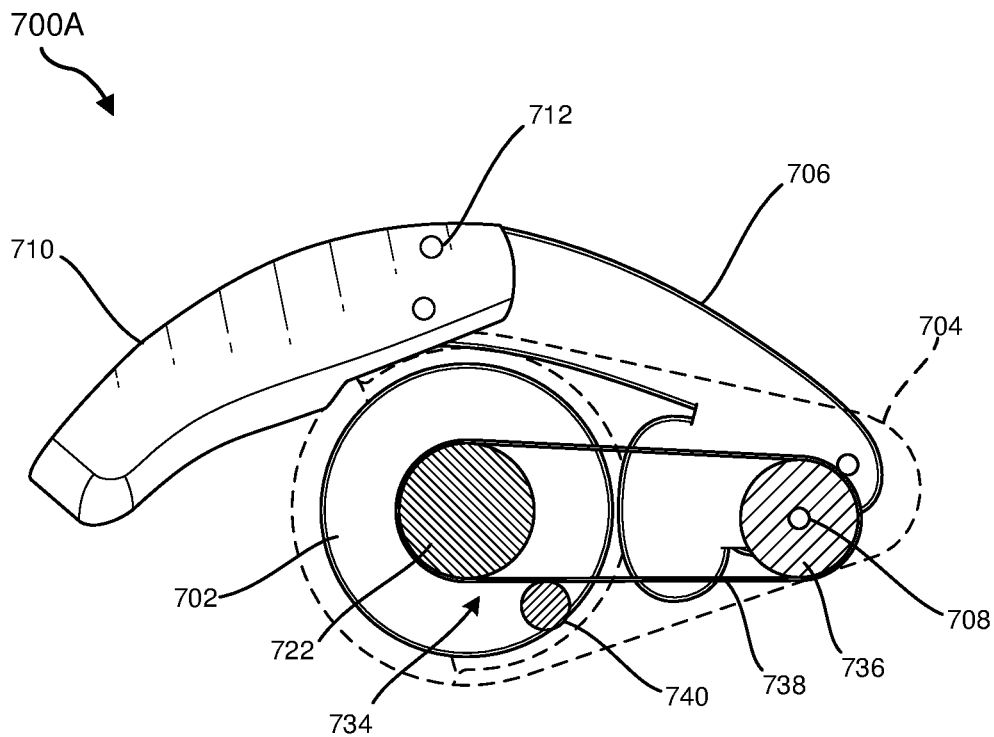
FIG. 7A is a top view of a finger force-feedback mechanism configured for providing force feedback in a single degree-of-freedom, according to at least one additional embodiment of the present disclosure.
Figure 7B:
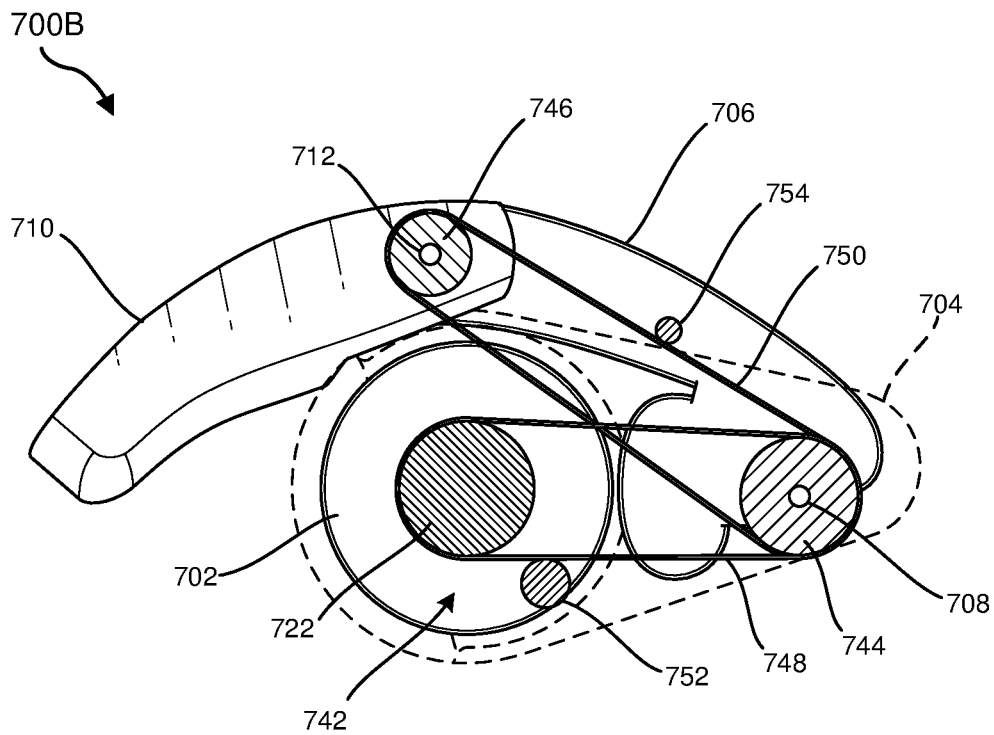
FIG. 7B is a top view of a finger force-feedback mechanism configured for providing force feedback in two degrees-of-freedom, according to at least one embodiment of the present disclosure.

FIG. 7A is a top view of a finger force-feedback mechanism 700A configured for providing force feedback to a proximal linkage element 706, according to at least one additional embodiment of the present disclosure. FIG. 7B is a top view of a finger force-feedback mechanism 700B configured for providing force feedback to a distal linkage element 710, according to at least one embodiment of the present disclosure.

The finger force-feedback mechanisms 700A, 700B may, in some respects, be similar to the finger force-feedback mechanisms 108, 300, 600 described above. For example, the finger force-feedback mechanisms 700A, 700B may each include a rotational element 702, a central housing 704, a proximal linkage element 706 rotationally coupled to the central housing 704 at a first pivot 708, and a distal linkage element 710 rotationally coupled to the proximal linkage element 706 at a second pivot 712. The rotational element 702 may include a rotary shaft 722.

Referring to FIG. 7A, the finger force-feedback mechanism 700A may include a proximal pulley system 734 for transmitting a force between the proximal linkage element 706 and the rotational element 702. The proximal pulley system 734 may include a proximal wheel 736 mounted on the proximal linkage element 706 and a proximal belt 738 that loops around and is engaged with the proximal wheel 736 and the rotary shaft 722. The proximal wheel 736 may be rotatable about the first pivot 708. In some examples, a proximal tensioning element 740 may be engaged with the proximal belt 738 to induce an appropriate tension in the proximal belt 738 and/or to adjust the tension in the proximal belt 738. The proximal pulley system 734 may be able to transmit force between the proximal linkage element 706 and the rotational element 702 in both rotational directions.

Referring to FIG. 7B, the finger force-feedback mechanism 700A may include a distal pulley system 742 for transmitting a force between the distal linkage element 710 and the rotational element 702. The distal pulley system 742 may include an intermediate wheel 744 that is rotationally coupled to the central housing 704 and a distal wheel 746 that is mounted on the distal linkage element 710. In the distal pulley system 742, the intermediate wheel 744 may have an axis of rotation that is collinear with the first pivot 708. The distal pulley system 742 may include a first belt 748 that loops around and is engaged with the rotary shaft 722 and the intermediate wheel 744. A second belt 750 may loop around and be engaged with the intermediate wheel 744 and the distal wheel 746. A first tensioning element 752 may be engaged with the first belt 748 to induce an appropriate tension in the first belt 748 and/or to adjust the tension in the first belt 748. Likewise, a second tensioning element 754 may be engaged with the second belt 750 to induce an appropriate tension in the second belt 750 and/or to adjust the tension in the second belt 750.

In embodiments in which rotation of the distal linkage element 710 is at least partially independent from rotation of the proximal linkage element 706 (e.g., if the finger force-feedback mechanism 700B has two degrees-of-freedom), rotation of the intermediate wheel 744 may be independent from rotation of the proximal linkage element 706. In this case, the finger force-feedback mechanism 700B may include a distal pulley system 742 as shown in FIG. 7B on one side (e.g., upper side) of the rotational element 702 and a proximal pulley system 734 as shown in FIG. 7A on an opposite side (e.g., lower side) of the rotational element 702. The rotational element 702 may include a first motor for transmitting force with the proximal pulley system 734 and a second, different motor for transmitting force with the distal pulley system 742.

In embodiments in which rotation of the distal linkage element 710 is fully dependent on rotation of the proximal linkage element 706 (e.g., if the finger force-feedback mechanism 700B has one degree-of-freedom), the intermediate wheel 744 may be mounted to (or otherwise rotatably constrained to) the proximal linkage element 706. Alternatively, the distal wheel 746 and second belt 750 may be omitted (e.g., as shown in FIG. 7A) and a rigid bar (e.g., the rigid bar 314 described above) may be coupled between the proximal linkage element 706 and the distal linkage element 710 to make rotation of the distal linkage element 710 fully dependent on the rotation of the proximal linkage element 706.

The diameter of any of the rotary shaft 722, proximal wheel 736, intermediate wheel 744, and/or distal wheel 746 may be selected to determine one or more mechanical properties (e.g., torque, angular rotation, ratio of angular rotation between components, etc.) of the finger force-feedback mechanisms 700A, 700B.

Figure 8:
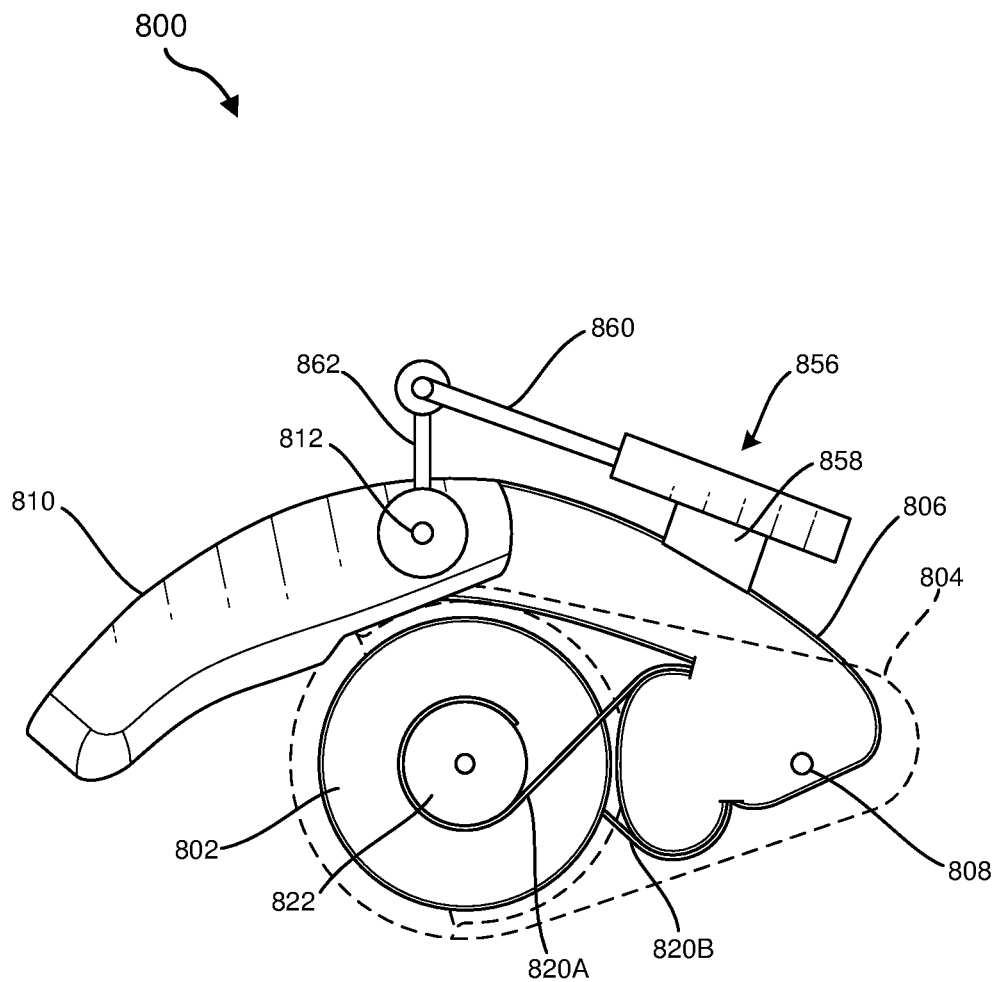
FIG. 8 is a top view of a finger force-feedback mechanism, according to at least one further embodiment of the present disclosure.

FIG. 8 is a top view of a finger force-feedback mechanism 800, according to at least one further embodiment of the present disclosure. The finger force-feedback mechanism 800 may, in some respects, be similar to the finger force-feedback mechanism 300 described above with reference to FIGS. 3A-5B. For example, the finger force-feedback mechanism 800 may include a rotational element 802, a central housing 804, a proximal linkage element 806 rotationally coupled to the central housing 804 at a first pivot 808, and a distal linkage element 810 rotationally coupled to the proximal linkage element 806 at a second pivot 812. The rotational element 802 may include a rotary shaft 822. An upper elongated force transmission element 820A and a lower elongated force transmission element 820B may extend between the proximal linkage element 806 and the rotary shaft 822 for providing force feedback to the proximal linkage element 806.

The finger force-feedback mechanism 800 of FIG. 8 may be configured to have two degrees-of-freedom, such that rotation of the distal linkage element 810 is at least partially independent from rotation of the proximal linkage element 806. For example, the finger force-feedback mechanism 800 may include a linear actuator 856 that may be configured to provide force feedback to the distal linkage element 810, which may be separate from the force feedback provided by the rotational element 802 to the proximal linkage element 806 via the force transmission elements 820. The linear actuator 856 may be, for example, a solenoid, a stepper actuator, or a brake mechanism.

A base 858 of the linear actuator 856 may be mounted on the proximal linkage element 806. An output element 860 (e.g., a movable rod) of the linear actuator 856 may be positioned and configured to provide rotational force feedback to the distal linkage element 810. For example, the output element 860 may be rotationally coupled to a lever arm 862 that may be mounted to the distal linkage element 810. The lever arm 862 may be rotatable relative to the proximal linkage element 806 about the second pivot 812. The lever arm 862 may be rigidly coupled to (or otherwise rotatable with) the distal linkage element 810.

In operation, activation of the rotatable element 802 may, via the force transmission elements 820, provide force feedback to the proximal linkage element 806. Activation of the linear actuator 856 may, via the output element 860 and the lever arm 862, provide force feedback to the distal linkage element 810.

Figure 9A:
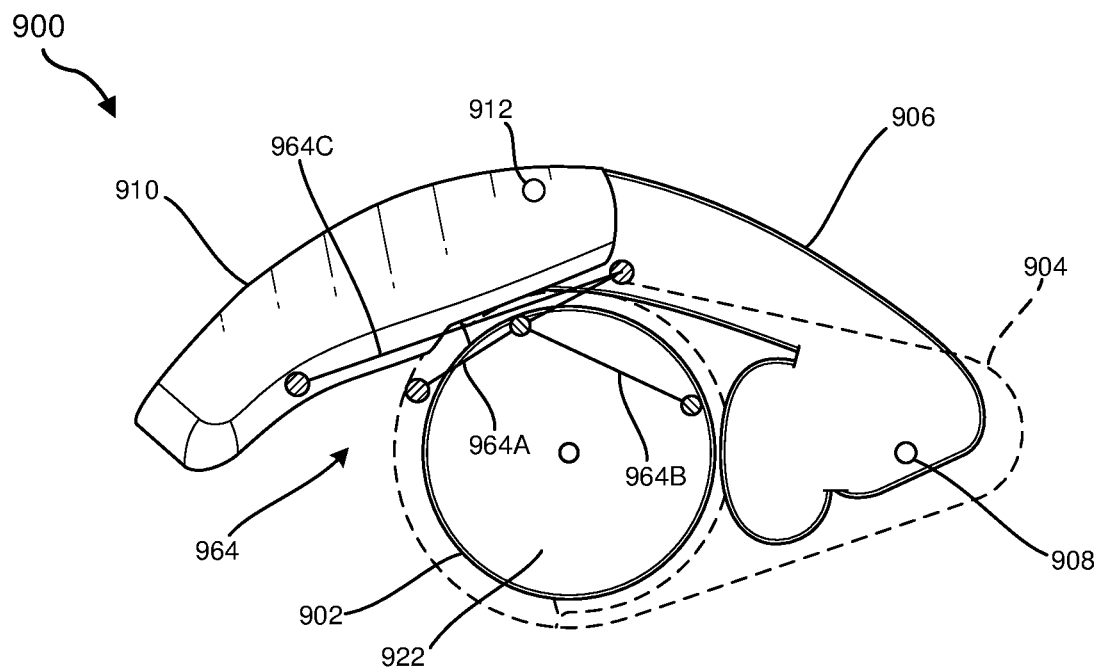
FIG. 9A is a top view of a finger force-feedback mechanism with rigid links in a closed position, according to at least one embodiment of the present disclosure.
Figure 9B:
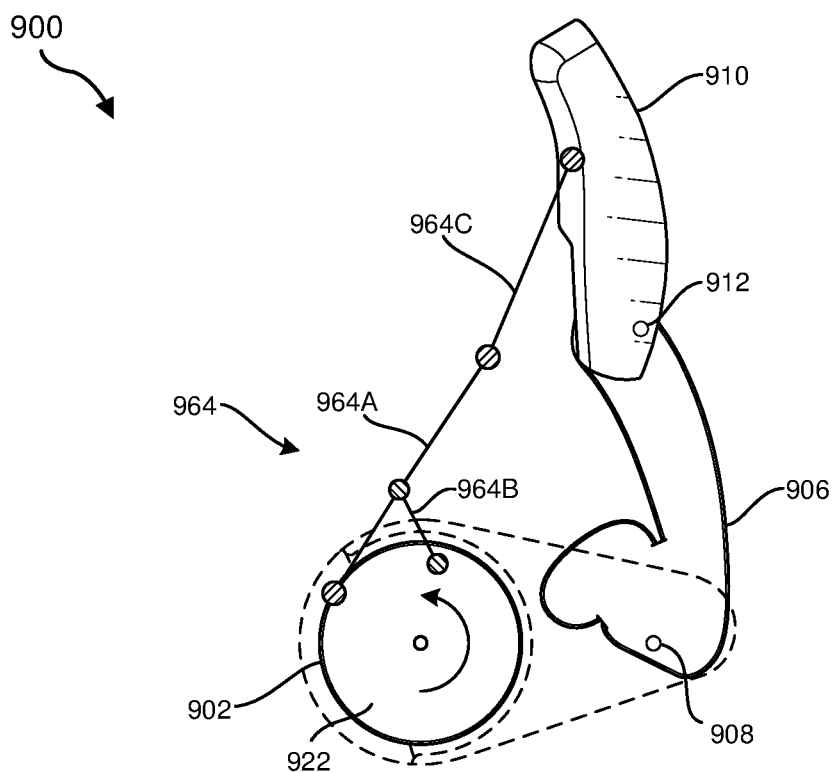
FIG. 9B is a top view of the finger force-feedback mechanism of FIG. 9A in an open position.

FIG. 9A is a top view of a finger force-feedback mechanism 900 with rigid links 964 in a closed position, according to at least one embodiment of the present disclosure. FIG. 9B is a top view of the finger force-feedback mechanism 900 in an open position. The finger force-feedback mechanism 900 may, in some respects, be similar to the finger force-feedback mechanism 300 described above. For example, the finger force-feedback mechanism 900 of FIGS. 9A and 9B may include a rotational element 902, a central housing 904, a proximal linkage element 906 rotationally coupled to the central housing 904 at a first pivot 908, and a distal linkage element 910 rotationally coupled to the proximal linkage element 906 at a second pivot 912. The rotational element 902 may include a rotary shaft 922.

The rigid links 964 may be configured to constrain movement of the distal linkage element 910 and/or of the proximal linkage element 906. For example, the rigid links 964 may include a first rigid link 964A rotationally coupled to the central housing 904 at a first end. A second rigid link 964B may be rotationally coupled to the rotary shaft 922 at a first end and to a central region of the first rigid link 964A at a second, opposite end. In this example, the rotary shaft 922 may have a larger diameter than the rotary shaft 322 shown in FIGS. 3A-5B, and the first end of the second rigid link 964A may be coupled to the rotary shaft 922 near an outer periphery of the rotary shaft 922. A third rigid link 964C may be rotationally coupled to a second end of the first rigid link 964A and rotationally coupled to the distal linkage element 910. The rigid links 964 may be configured to constrain rotation and movement of the distal linkage element 910 and/or of the proximal linkage element 906 to a predetermined pathway. In some embodiments, the finger force-feedback mechanism 900 may have a single degree-of-freedom, such that movement of the distal linkage element 910 and of the proximal linkage element 906 may be codependent.

Figure 10A:
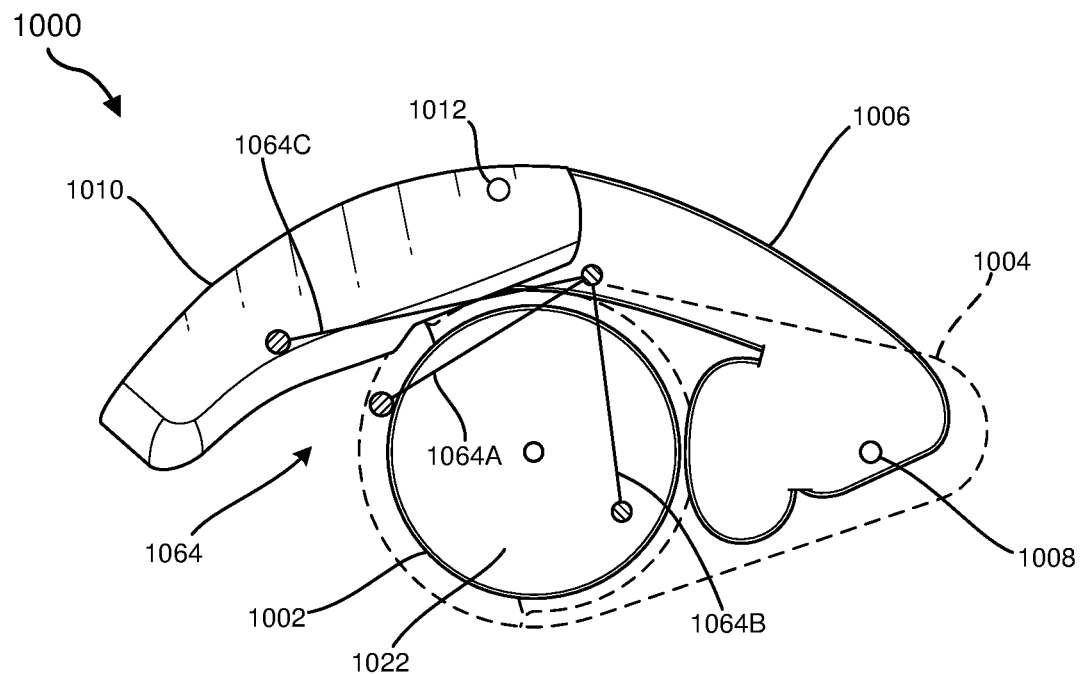
FIGS. 10A and 10B are top views of a finger force-feedback mechanism with rigid links in closed and open positions, respectively, according to at least one additional embodiment of the present disclosure.
Figure 10B:
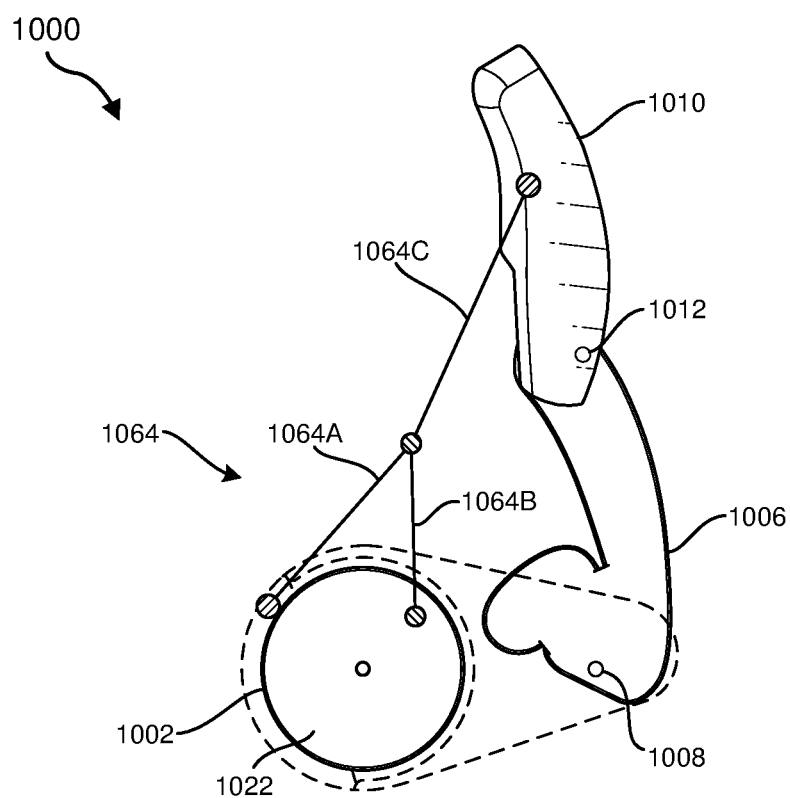

FIGS. 10A and 10B are top views of a finger force-feedback mechanism 1000 with rigid links 1064 in closed and open positions, respectively, according to at least one additional embodiment of the present disclosure. The finger force-feedback mechanism 1000 may, in some respects, be similar to the finger force-feedback mechanism 900 described above. For example, the finger force-feedback mechanism 1000 of FIGS. 10A and 10B may include a rotational element 1002, a central housing 1004, a proximal linkage element 1006 rotationally coupled to the central housing 1004 at a first pivot 1008, and a distal linkage element 1010 rotationally coupled to the proximal linkage element 1006 at a second pivot 1012. The rotational element 1002 may include a rotary shaft 922.

The rigid links 1064 may be configured to constrain movement of the distal linkage element 1010 and/or of the proximal linkage element 1006. For example, the rigid links 1064 may include a first rigid link 1064A rotationally coupled to the central housing 1004 at a first end. A first end of a second rigid link 1064B may be rotationally coupled to the rotary shaft 1022 and a second, opposite end may be rotationally coupled to a second end of the first rigid link 1064A. The first end of the second rigid link 1064A may be coupled to the rotary shaft 1022 near an outer periphery of the rotary shaft 1022. A third rigid link 1064C may be rotationally coupled to the second end of the first rigid link 1064A and to the second end of the second rigid link 1064B. The third rigid link 1064C may also be rotationally coupled to the distal linkage element 1010. The rigid links 1064 may be configured to constrain rotation and movement of the distal linkage element 1010 and/or of the proximal linkage element 1006 to a predetermined pathway. In some embodiments, the finger force-feedback mechanism 1000 may have a single degree-of-freedom, such that movement of the distal linkage element 1010 and of the proximal linkage element 1006 may be codependent.

Figure 11A:
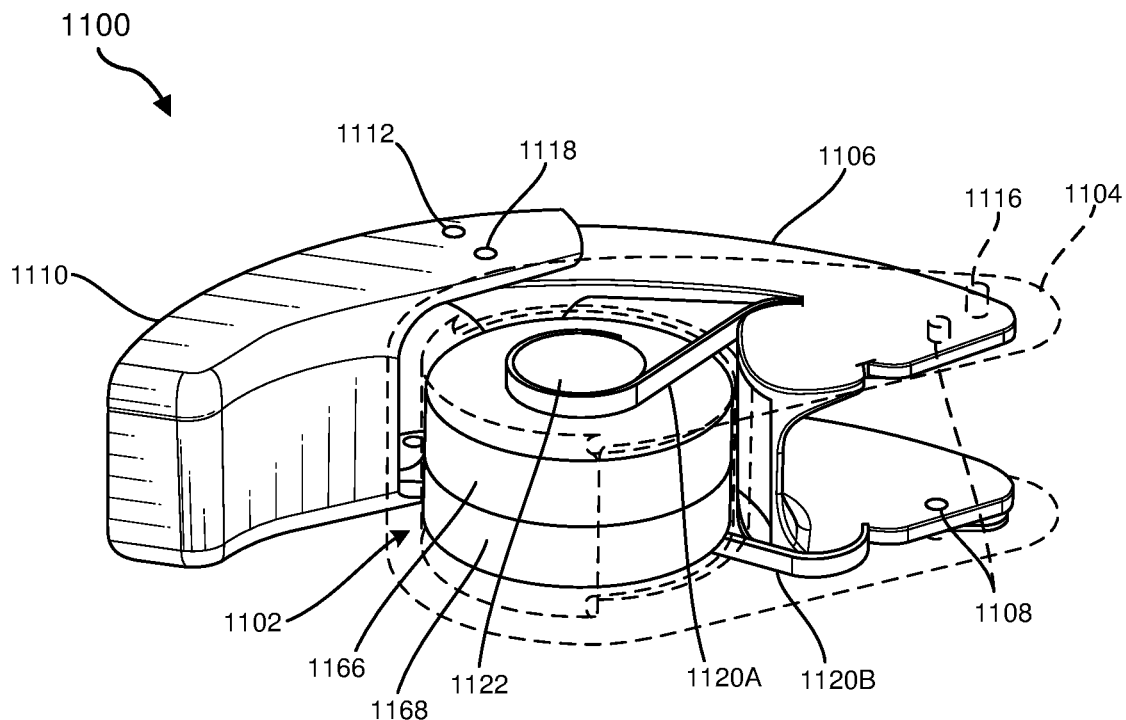
FIG. 11A is a perspective view of a finger force-feedback mechanism, according to at least one other embodiment of the present disclosure.
Figure 11B:
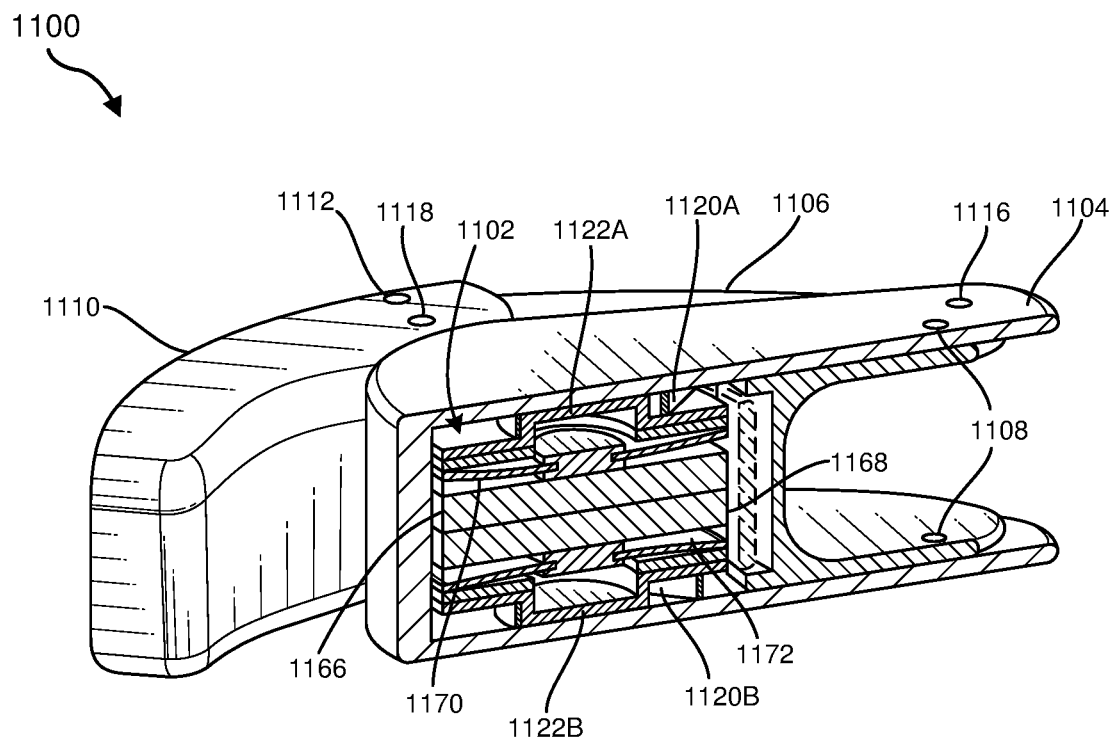
FIG. 11B is a cross-sectional perspective view of the finger force-feedback mechanism of FIG. 11A.

FIG. 11A is a perspective view of a finger force-feedback mechanism 1100, according to at least one other embodiment of the present disclosure. FIG. 11B is a cross-sectional perspective view of the finger force-feedback mechanism 1100. The finger force-feedback mechanism 1100 may, in some respects, be similar to the finger force-feedback mechanism 300 described above. For example, the finger force-feedback mechanism 1100 may include a rotational element 1102, a central housing 1104, a proximal linkage element 1106 rotationally coupled to the central housing 1104 at a first pivot 1108, and a distal linkage element 1110 rotationally coupled to the proximal linkage element 1106 at a second pivot 1112. An upper elongated force transmission element 1120A and a lower elongated force transmission element 1120B may operably couple the rotational element 1102 to the proximal linkage element 1106.

The rotational element 1102 may include a rotary shaft 1122, which may include an upper rotary shaft 1122A and a lower rotary shaft 1122B, as shown in FIG. 11B. The rotational element 1102 may include an upper brake element 1166 and a lower brake element 1168. For example, the upper brake element 1166 may include an upper piezoelectric brake 1170 and the lower brake element 1168 may include a lower piezoelectric brake 1172. Each of the piezoelectric brakes 1170, 1172 may include a disc of piezoelectric material that is configured to deform upon application of a sufficient voltage. In some examples, the disc may include or may press against a high-friction surface (e.g., an elastomeric material, a roughened material, etc.) for engaging with the respective rotary shafts 1122A, 1122B when activated for a braking action. In some examples, the disc of piezoelectric material may have a so-called "bimorph" construction, with an upper piezoelectric material and a lower piezoelectric material separated by an electrically insulative material. The brake force applied by the piezoelectric brakes 1172, 1174 may be in an axial direction (relative to an axis of rotation of the rotary shaft 1122). Activation of the upper brake element 1166 and/or of the lower brake element 1168 may provide force feedback to the proximal linkage element 1106 and/or to the distal linkage element 1110 via the force transmission elements 1120A and 1120B.

Figure 12:
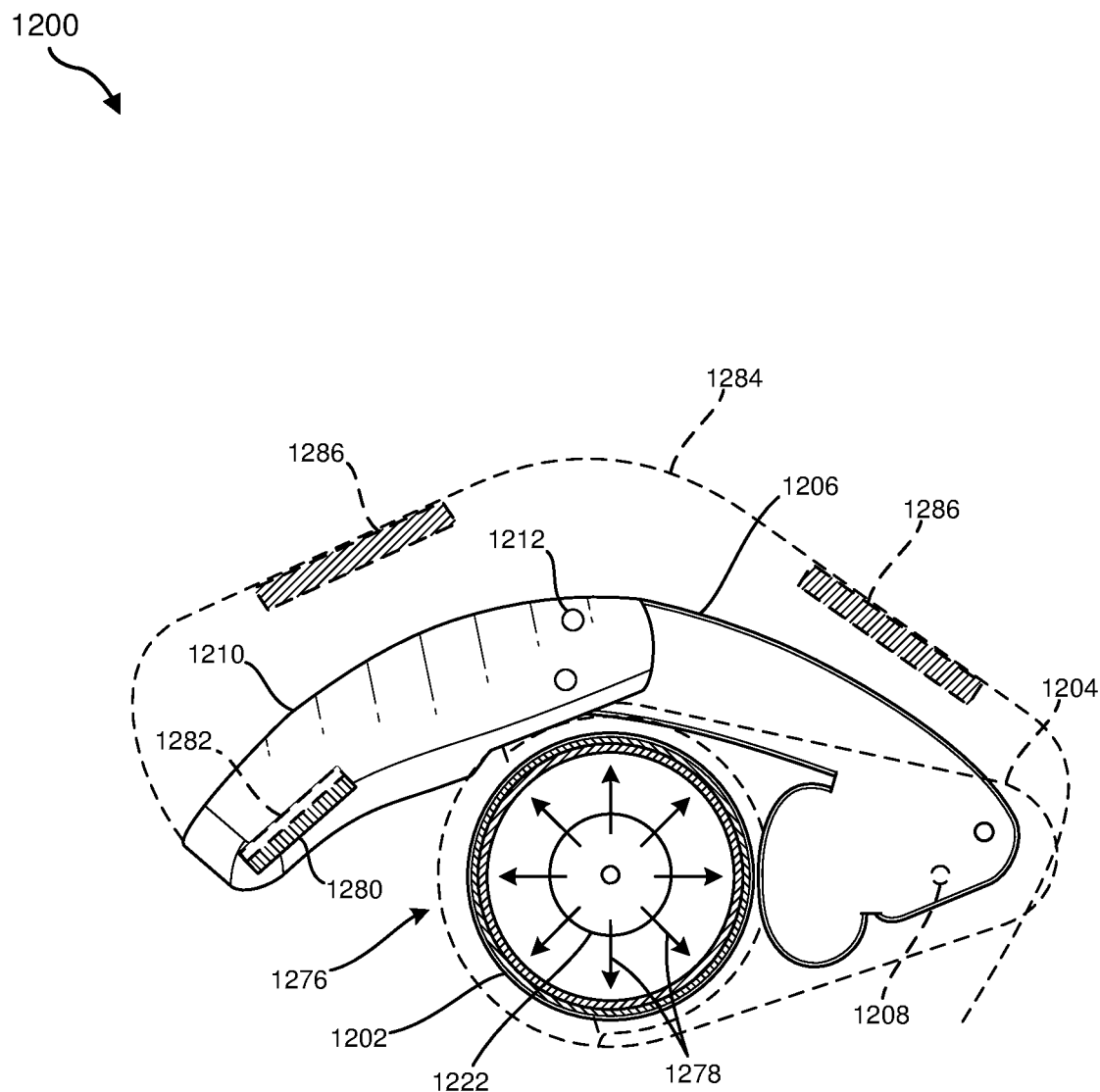
FIG. 12 is a top view of a finger force-feedback mechanism, according to at least one additional embodiment of the present disclosure.

FIG. 12 is a top view of a finger force-feedback mechanism 1200, according to at least one additional embodiment of the present disclosure. The finger force-feedback mechanism 1200 of FIG. 12 may, in some respects, be similar to the finger force-feedback mechanism 300 described above. For example, the finger force-feedback mechanism 1200 may include a rotational element 1202, a central housing 1204, a proximal linkage element 1206 rotationally coupled to the central housing 1104 at a first pivot 1108, and a distal linkage element 1210 rotationally coupled to the proximal linkage element 1206 at a second pivot 1212. The rotational element 1202 may include a rotary shaft 1222.

The rotational element 1202 may include a brake mechanism 1274. However, unlike the brake elements 1166, 1168 described above, the brake mechanism 1276 may apply a radial brake force 1278 to the rotary shaft 1222 for providing force feedback to the proximal linkage element 1206 and/or to the distal linkage element 1210.

Additionally, the finger force-feedback mechanism 1200 may include at least one input button 1280 that may be positioned for manipulation by a fingertip of a user. For example, the input button 1280 may be positioned on or in the distal linkage element 1210. The input button 1280 may be activatable upon a sufficient force being applied to the input button 1280. In some examples, the input button 1280 may be configured such that the force required for activation may be reached only when the brake mechanism 1274 is engaged or when the finger force-feedback mechanism 1200 is fully closed, either of which may inhibit (e.g., reduce or stop) free rotation of the distal linkage element 1210. Alternatively or additionally, manipulation of the input button 1280 may be recorded as an action at certain times as controlled by software. For example, an artificial-reality system that uses the finger force-feedback mechanism 1200 may be configured to perform an action when the input button 1280 is depressed when the user interacts with a virtual object (e.g., a virtual button, a virtual trigger, a surface, etc.), but manipulation of the input button 1280 at other times may be effectively ignored. In some embodiments, the input button 1280 may include or be replaced by a vibrotactor 1282 (e.g., a piezoelectric actuator for providing tactile feedback in the form of vibration).

In some examples, a glove finger 1284 may be coupled to the distal linkage element 1210 and/or to the proximal linkage element 1206. The glove finger 1284 may facilitate moving the distal linkage element 1210 and/or the proximal linkage element 1206 when the user's finger both opens and closes. Optionally, the glove finger 1284 of the glove may include one or more sensors 1286, such as a strain gauge or a pressure sensor. In some embodiments, the sensor(s) 1286 may help the finger force-feedback mechanism 1200 sense when the user is opening or closing the finger force-feedback mechanism 1200.

Figure 13:
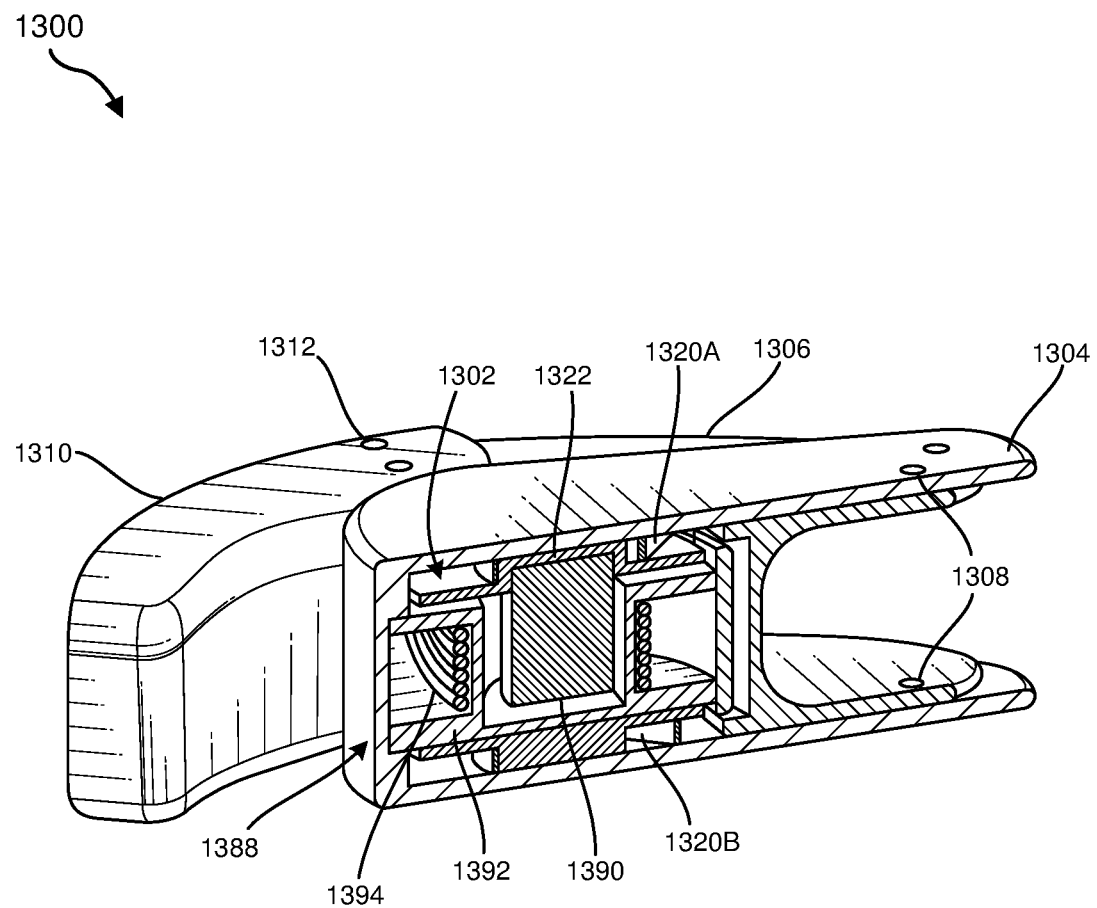
FIG. 13 is a cross-sectional perspective view of a finger force-feedback mechanism, according to at least one further embodiment of the present disclosure.

FIG. 13 is a cross-sectional perspective view of a finger force-feedback mechanism 1300, according to at least one further embodiment of the present disclosure. The finger force-feedback mechanism 1300 may, in some respects, be similar to the finger force-feedback mechanism 300 described above. For example, the finger force-feedback mechanism 1300 may include a rotational element 1302, a central housing 1304, a proximal linkage element 1306 rotationally coupled to the central housing 1304 at a first pivot 1308, and a distal linkage element 1310 rotationally coupled to the proximal linkage element 1306 at a second pivot 1312. The rotational element 1302 may include a rotary shaft 1322. An upper elongated force transmission element 1320A and a lower elongated force transmission element 1320B may operably couple the rotary shaft 1322 of the rotational element 1302 to the proximal linkage element 1306.

As shown in FIG. 13, the finger force-feedback mechanism 1300 may include a voice coil actuator ("VCA") brake mechanism 1388. The VCA brake mechanism 1388 may include a central magnet 1390 that may be affixed to the rotary shaft 1322, a bobbin 1392 surrounding the central magnet 1390, and a wire coil 1394 wrapped around the bobbin 1392. Optionally, the bobbin 1392 may be biased to an open position, such as by a spring element. When a sufficient voltage is applied to the wire coil 1394, the bobbin may axially move to be in contact with the rotary shaft 1322, which may apply a braking force to the rotary shaft 1322. The voltage applied to the wire coil 1394 may be proportional to the braking force on the rotary shaft 1322. Thus, activation of the VCA brake mechanism 1388 may provide force feedback to the proximal linkage element 1306 and/or to the distal linkage element 1310 via the force transmission elements 1320.

Figure 14:
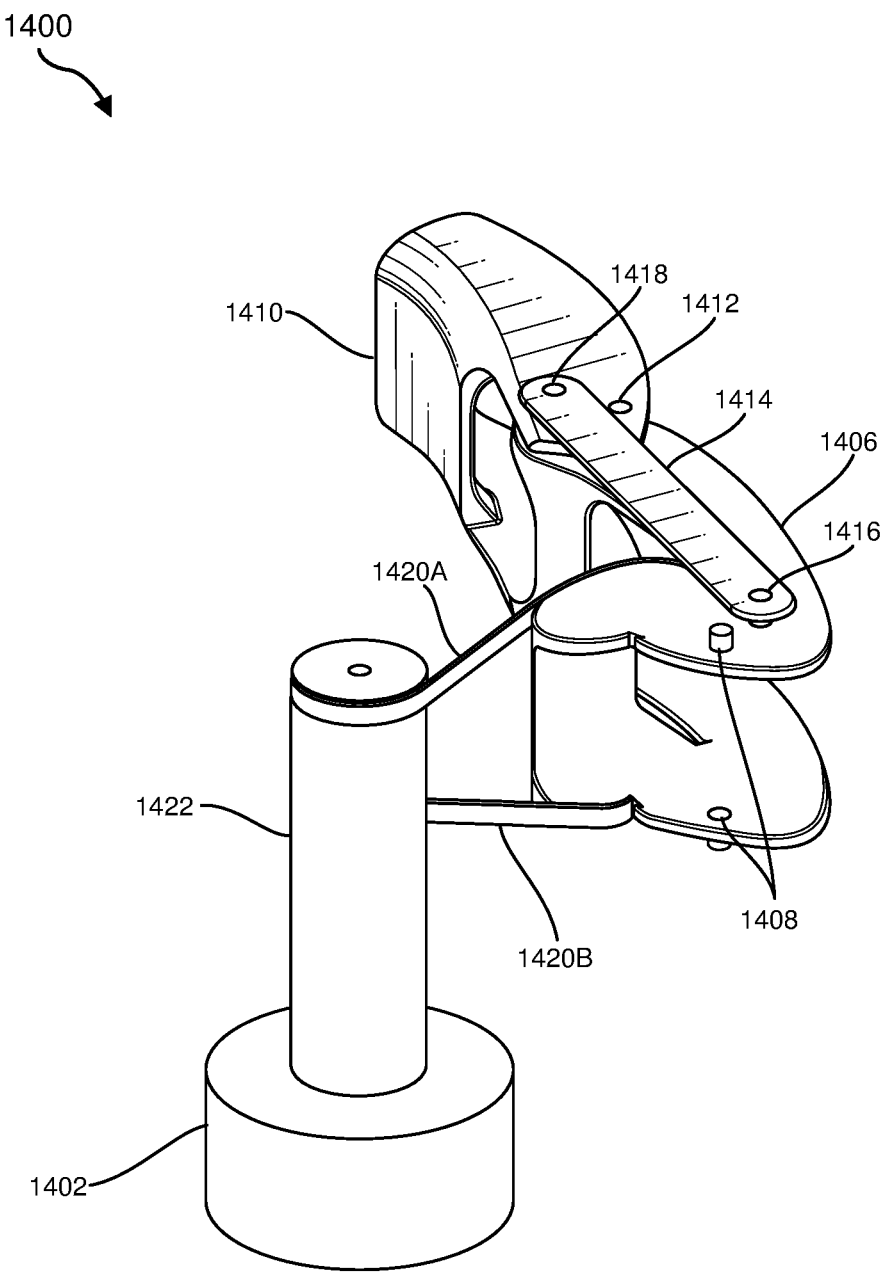
FIG. 14 is a perspective view of a finger force-feedback mechanism, according to at least one other embodiment of the present disclosure.

FIG. 14 is a perspective view of a finger force-feedback mechanism 1400, according to at least one other embodiment of the present disclosure. The finger force-feedback mechanism 1400 may, in some respects, be similar to the finger force-feedback mechanism 300 describe above. For example, the finger force-feedback mechanism 1400 may include a rotational element 1402, a proximal linkage element 1406 that may be rotatable about a first pivot 1408, and a distal linkage element 1410 rotationally coupled to the proximal linkage element 1406 at a second pivot 1412. A rigid bar 1414 may be rotationally coupled to the proximal linkage element 1406 at a third pivot 1416 and to the distal linkage element 1410 at a fourth pivot 1418. The rotational element 1402 may include a rotary shaft 1422. An upper elongated force transmission element 1420A and a lower elongated force transmission element 1420B may extend between the proximal linkage element 1406 and the rotary shaft 1422 for providing force feedback to the proximal linkage element 1406.

As illustrated in FIG. 14, the rotational element 1402 may be a motor or brake positioned to be outside of a user's grip when a corresponding handheld controller is held by the user. The rotary shaft 1422 be elongated and may extend into the user's grip. In this example, the rotary shaft 1422 may have a smaller diameter than the rotational element 1402, such that the user's hand may be able to close more fully than in embodiments in which the rotational element 1402 is positioned within the user's grip when the handheld controller is held. In some embodiments, multiple concentric rotary shafts 1422 may extend from respective rotational elements 1402 (e.g., motors or brakes) to the corresponding finger force-feedback mechanisms 1400 for each of the user's fingers.

FIG. 15 is a flow diagram of an example method 1500 for fabricating a handheld controller, according to at least one embodiment of the present disclosure. At operation 1510, a proximal linkage element may be rotationally coupled to a housing of a rotational element at a first pivot. Operation 1510 may be performed in a variety of ways. For example, the proximal linkage element may be rotationally coupled to the housing of the rotational element via a central housing that holds the rotational element, as shown in any of the embodiments of FIGS. 3A-14 and described above. The rotational element may be or include, for example, a motor, a rotary encoder, a brake, and/or a clutch.

At operation 1520, a distal linkage element may be rotationally coupled to the proximal linkage element at a second pivot. Operation 1520 may be performed in a variety of ways. For example, the distal linkage element may be rotationally coupled to the proximal linkage element as shown in any of the embodiments of FIGS. 3A-14 and described above. In some embodiments, a rigid bar may be rotationally coupled to the proximal linkage element at a third pivot that is different from the first pivot and may also be rotationally coupled to the distal linkage element at a fourth pivot that is different from the second pivot. The rigid bar may be positioned and configured to constrain rotation of the distal linkage element relative to rotation of the proximal linkage element.

At operation 1530, a rotary shaft of the rotational element may be coupled to the proximal linkage element with a force transmission element. Operation 1530 may be performed in a variety of ways. For example, the force transmission element may be a belt, a cable, a metallic tape, a gear, a pulley system, or a rigid link.

FIG. 16 is a flow diagram of an example method 1600 for operating a handheld controller, according to at least one embodiment of the present disclosure. At operation 1610, a position of a user's hand in space may be sensed. Operation 1610 may be performed in a variety of ways. For example, a handheld controller held by the user's hand may be optically located using an optical sensor (e.g., a camera). In addition or alternatively, one or more motion sensors (e.g., a gyroscope, an IMU, an accelerometer, etc.) in the handheld controller may be used to locate the user's hand in space.

At operation 1620, rotation of the user's finger may be sensed by determining an angular position of a rotary shaft that is coupled to a proximal linkage element via a force transmission element. Operation 1620 may be performed in a variety of ways. For example, a rotary encoder associated with the rotary shaft may be used to determine the angular position of the rotary shaft. The rotary shaft may be coupled to the proximal linkage via, for example, a belt, a cable, a metallic tape, a gear, a pulley system, or a rigid link, such as described above with reference to any of the embodiments of FIGS. 3A-10B.

At operation 1630, further rotation of the user's finger may be resisted with the rotary shaft when the position of the user's hand and the rotation of the user's finger correlate to an interaction with a computer-generated image of an object. Operation 1630 may be performed in a variety of ways. For example, the rotation of the user's finger may be resisted by activation of a rotational element, such as a motor, a brake (e.g., a piezoelectric brake system, a VCA brake system, etc.), a linear actuator, and/or a clutch, such as described above with reference to FIGS. 3A-5B and 11A-13. Additionally, a force associated with activation of the rotational element may be transmitted to a proximal linkage element and/or a distal linkage element via a force transmission element (e.g., a belt, a cable, a metallic tape, a gear, a pulley system, or a rigid link). The resistance of the further rotation of the user's finger may provide force feedback to the user.

Accordingly, the present disclosure includes handheld controllers and finger force-feedback mechanisms that may be used to effectively provide force feedback to a user. Artificial-reality systems employing such handheld controllers and finger force-feedback mechanisms may provide an improved experience to a user by providing a sensation that the user is touching and/or grasping virtual objects displayed by the artificial-reality systems. In addition, some embodiments of the present disclosure may be smaller than conventional systems that provide force feedback.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1700 in FIG. 17) or that visually immerses a user in an artificial reality (such as, e.g., virtual-reality system 1800 in FIG. 18). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 17:
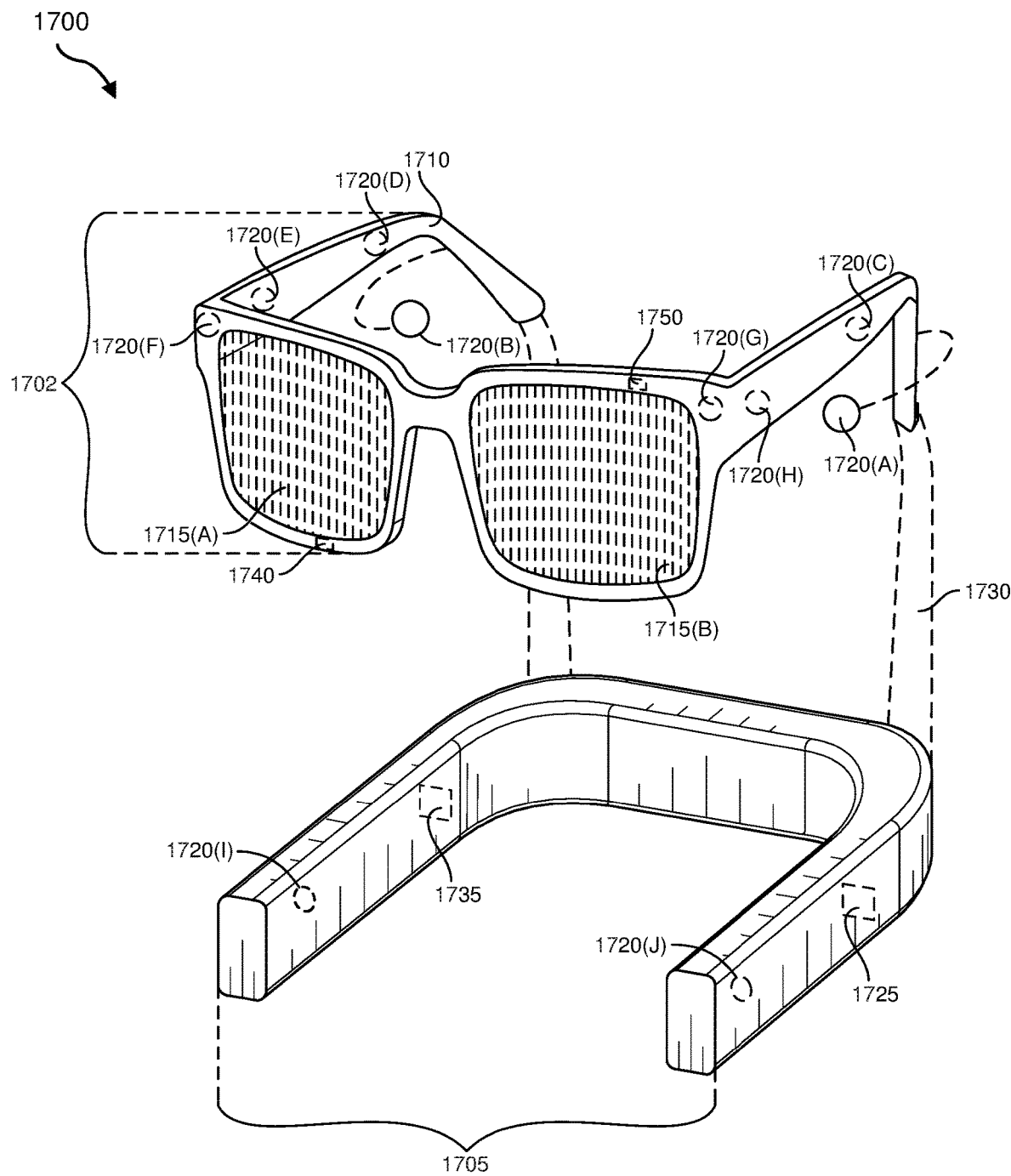
FIG. 17 is an illustration of example augmented-reality glasses that may be used in connection with embodiments of this disclosure.

Turning to FIG. 17, the augmented-reality system 1700 may include an eyewear device 1702 with a frame 1710 configured to hold a left display device 1715(A) and a right display device 1715(B) in front of a user's eyes. The display devices 1715(A) and 1715(B) may act together or independently to present an image or series of images to a user. While the augmented-reality system 1700 includes two displays, embodiments of this disclosure may be implemented in augmented-reality systems with a single NED or more than two NEDs.

In some embodiments, the augmented-reality system 1700 may include one or more sensors, such as sensor 1740. The sensor 1740 may generate measurement signals in response to motion of the augmented-reality system 1700 and may be located on substantially any portion of the frame 1710. The sensor 1740 may represent one or more of a variety of different sensing mechanisms, such as a position sensor, an IMU, a depth camera assembly, a structured light emitter and/or detector, or any combination thereof. In some embodiments, the augmented-reality system 1700 may or may not include the sensor 1740 or may include more than one sensor. In embodiments in which the sensor 1740 includes an IMU, the IMU may generate calibration data based on measurement signals from the sensor 1740. Examples of sensor 1740 may include, without limitation, accelerometers, gyroscopes, magnetometers, other suitable types of sensors that detect motion, sensors used for error correction of the IMU, or some combination thereof.

In some examples, the augmented-reality system 1700 may also include a microphone array with a plurality of acoustic transducers 1720(A)-1720(J), referred to collectively as acoustic transducers 1720. The acoustic transducers 1720 may represent transducers that detect air pressure variations induced by sound waves. Each acoustic transducer 1720 may be configured to detect sound and convert the detected sound into an electronic format (e.g., an analog or digital format). The microphone array in FIG. 18 may include, for example, ten acoustic transducers: 1720(A) and 1720(B), which may be designed to be placed inside a corresponding ear of the user, acoustic transducers 1720(C), 1720(D), 1720(E), 1720(F), 1720(G), and 1720(H), which may be positioned at various locations on frame 1710, and/or acoustic transducers 1720(I) and 1720(J), which may be positioned on a corresponding neckband 1705.

In some embodiments, one or more of the acoustic transducers 1720(A)-(F) may be used as output transducers (e.g., speakers). For example, the acoustic transducers 1720(A) and/or 1720(B) may be earbuds or any other suitable type of headphone or speaker.

The configuration of the acoustic transducers 1720 of the microphone array may vary. While the augmented-reality system 1700 is shown in FIG. 17 as having ten acoustic transducers 1720, the number of acoustic transducers 1720 may be greater or less than ten. In some embodiments, using higher numbers of the acoustic transducers 1720 may increase the amount of audio information collected and/or the sensitivity and accuracy of the audio information. In contrast, using a lower number of the acoustic transducers 1720 may decrease the computing power required by an associated controller 1750 to process the collected audio information. In addition, the position of each acoustic transducer 1720 of the microphone array may vary. For example, the position of any of the acoustic transducers 1720 may include a defined position on the user, a defined coordinate on frame 1710, an orientation associated with each acoustic transducer 1720, or some combination thereof.

The acoustic transducers 1720(A) and 1720(B) may be positioned on different parts of the user's ear, such as behind the pinna, behind the tragus, and/or within the auricle or fossa. Or, there may be additional acoustic transducers 1720 on or surrounding the ear in addition to the acoustic transducers 1720 inside the ear canal. Having an acoustic transducer 1720 positioned next to an ear canal of a user may enable the microphone array to collect information on how sounds arrive at the ear canal. By positioning at least two of the acoustic transducers 1720 on either side of a user's head (e.g., as binaural microphones), the augmented-reality device 1700 may simulate binaural hearing and capture a 3D stereo sound field around about a user's head. In some embodiments, the acoustic transducers 1720(A) and 1720(B) may be connected to the augmented-reality system 1700 via a wired connection 1730, and in other embodiments the acoustic transducers 1720(A) and 1720(B) may be connected to the augmented-reality system 1700 via a wireless connection (e.g., a Bluetooth connection). In still other embodiments, the acoustic transducers 1720(A) and 1720(B) may not be used at all in conjunction with the augmented-reality system 1700.

The acoustic transducers 1720 on the frame 1710 may be positioned in a variety of different ways, including along the length of the temples, across the bridge, above or below the display devices 1715(A) and 1715(B), or some combination thereof. The acoustic transducers 1720 may also be oriented such that the microphone array is able to detect sounds in a wide range of directions surrounding the user wearing the augmented-reality system 1700. In some embodiments, an optimization process may be performed during manufacturing of the augmented-reality system 1700 to determine relative positioning of each acoustic transducer 1720 in the microphone array.

In some examples, the augmented-reality system 1700 may include or be connected to an external device (e.g., a paired device), such as the neckband 1705. The neckband 1705 generally represents any type or form of paired device. Thus, the following discussion of the neckband 1705 may also apply to various other paired devices, such as charging cases, smart watches, smart phones, wrist bands, other wearable devices, hand-held controllers, tablet computers, laptop computers, other external compute devices, etc.

As shown, the neckband 1705 may be coupled to the eyewear device 1702 via one or more connectors. The connectors may be wired or wireless and may include electrical and/or non-electrical (e.g., structural) components. In some cases, the eyewear device 1702 and neckband 1705 may operate independently without any wired or wireless connection between them. While FIG. 17 illustrates the components of the eyewear device 1702 and the neckband 1705 in example locations respectively on the eyewear device 1702 and the neckband 1705, the components may be located elsewhere and/or distributed differently on the eyewear device 1702 and/or neckband 1705. In some embodiments, the components of the eyewear device 1702 and neckband 1705 may be located on one or more additional peripheral devices paired with the eyewear device 1702, the neckband 1705, or some combination thereof.

Pairing external devices, such as the neckband 1705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1700 may be provided by a paired device or shared between a paired device and an eyewear device, thus reducing the weight, heat profile, and form factor of the eyewear device overall while still retaining desired functionality. For example, the neckband 1705 may allow components that would otherwise be included on an eyewear device to be included in the neckband 1705 since users may tolerate a heavier weight load on their shoulders than they would tolerate on their heads. The neckband 1705 may also have a larger surface area over which to diffuse and disperse heat to the ambient environment. Thus, the neckband 1705 may allow for greater battery and computation capacity than might otherwise have been possible on a stand-alone eyewear device. Since weight carried in the neckband 1705 may be less invasive to a user than weight carried in the eyewear device 1702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 1705 may be communicatively coupled with the eyewear device 1702 and/or to other devices. These other devices may provide certain functions (e.g., tracking, localizing, depth mapping, processing, storage, etc.) to the augmented-reality system 1700. In the embodiment of FIG. 17, the neckband 1705 may include two acoustic transducers (e.g., 1720(I) and 1720(J)) that are part of the microphone array (or potentially form their own microphone subarray). The neckband 1705 may also include a controller 1725 and a power source 1735.

The acoustic transducers 1720(I) and 1720(J) of the neckband 1705 may be configured to detect sound and convert the detected sound into an electronic format (analog or digital). In the embodiment of FIG. 17, the acoustic transducers 1720(I) and 1720(J) may be positioned on the neckband 1705, thereby increasing the distance between the neckband acoustic transducers 1720(I) and 1720(J) and other acoustic transducers 1720 positioned on the eyewear device 1702. In some cases, increasing the distance between the acoustic transducers 1720 of the microphone array may improve the accuracy of beamforming performed via the microphone array. For example, if a sound is detected by the acoustic transducers 1720(C) and 1720(D) and the distance between the acoustic transducers 1720(C) and 1720(D) is greater than, e.g., the distance between the acoustic transducers 1720(D) and 1720(E), the determined source location of the detected sound may be more accurate than if the sound had been detected by the acoustic transducers 1720(D) and 1720(E).

The controller 1725 of the neckband 1705 may process information generated by the sensors on the neckband 1705 and/or the augmented-reality system 1700. For example, the controller 1725 may process information from the microphone array that describes sounds detected by the microphone array. For each detected sound, the controller 1725 may perform a direction-of-arrival (DOA) estimation to estimate a direction from which the detected sound arrived at the microphone array. As the microphone array detects sounds, the controller 1725 may populate an audio data set with the information. In embodiments in which the augmented-reality system 1700 includes an inertial measurement unit, the controller 1725 may compute all inertial and spatial calculations from the IMU located on the eyewear device 1702. A connector may convey information between the augmented-reality system 1700 and the neckband 1705 and between the augmented-reality system 1700 and the controller 1725. The information may be in the form of optical data, electrical data, wireless data, or any other transmittable data form. Moving the processing of information generated by the augmented-reality system 1700 to the neckband 1705 may reduce weight and heat in the eyewear device 1702, making it more comfortable to the user.

The power source 1735 in the neckband 1705 may provide power to the eyewear device 1702 and/or to the neckband 1705. The power source 1735 may include, without limitation, lithium ion batteries, lithium-polymer batteries, primary lithium batteries, alkaline batteries, or any other form of power storage. In some cases, the power source 1735 may be a wired power source. Including the power source 1735 on the neckband 1705 instead of on the eyewear device 1702 may help better distribute the weight and heat generated by the power source 1735.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality system 1800 illustrated in FIG. 18, that mostly or completely covers a user's field of view. The virtual-reality system 1800 may include a front rigid body 1802 and a band 1804 shaped to fit around a user's head. The virtual-reality system 1800 may also include output audio transducers 1806(A) and 1806(B). Furthermore, while not shown in FIG. 18, the front rigid body 1802 may include one or more electronic elements, including one or more electronic displays, one or more IMUs, one or more tracking emitters or detectors, and/or any other suitable device or system for creating an artificial-reality experience.

Artificial-reality systems may include a variety of types of visual feedback mechanisms. For example, display devices in the augmented-reality system 1700 and/or virtual-reality system 1800 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in the augmented-reality system 1700 and/or the virtual-reality system 1800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, the augmented-reality system 1700 and/or the virtual-reality system 1800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, the artificial-reality systems 1700 and 1800 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 19:
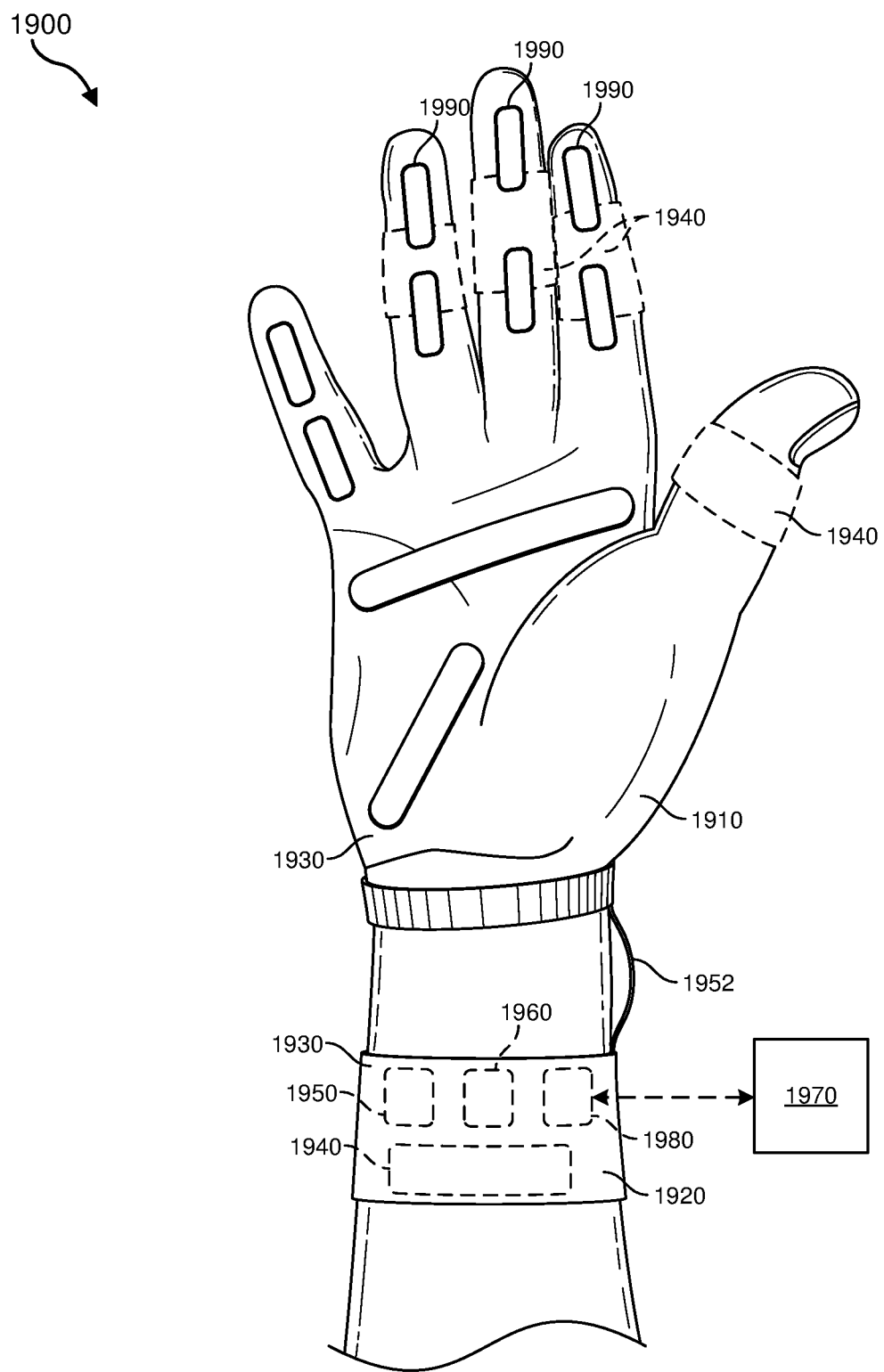
FIG. 19 is an illustration of example haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 19 illustrates a vibrotactile system 1900 in the form of a wearable glove (haptic device 1910) and wristband (haptic device 1920). The haptic device 1910 and the haptic device 1920 are shown as examples of wearable devices that include a flexible, wearable textile material 1930 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1940 may be positioned at least partially within one or more corresponding pockets formed in the textile material 1930 of the vibrotactile system 1900. The vibrotactile devices 1940 may be positioned in locations to provide a vibrating sensation (e.g., haptic feedback) to a user of the vibrotactile system 1900. For example, the vibrotactile devices 1940 may be positioned against the user's finger(s), thumb, or wrist, as shown in FIG. 19. The vibrotactile devices 1940 may, in some examples, be sufficiently flexible to conform to or bend with the user's corresponding body part(s).

A power source 1950 (e.g., a battery) for applying a voltage to the vibrotactile devices 1940 for activation thereof may be electrically coupled to the vibrotactile devices 1940, such as via conductive wiring 1952. In some examples, each of the vibrotactile devices 1940 may be independently electrically coupled to the power source 1950 for individual activation. In some embodiments, a processor 1960 may be operatively coupled to the power source 1950 and configured (e.g., programmed) to control activation of the vibrotactile devices 1940.

The vibrotactile system 1900 may be implemented in a variety of ways. In some examples, the vibrotactile system 1900 may be a standalone system with integral subsystems and components for operation independent of other devices and systems. As another example, the vibrotactile system 1900 may be configured for interaction with another device or system 1970. For example, the vibrotactile system 1900 may, in some examples, include a communications interface 1980 for receiving and/or sending signals to the other device or system 1970. The other device or system 1970 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. The communications interface 1980 may enable communications between the vibrotactile system 1900 and the other device or system 1970 via a wireless (e.g., Wi-Fi, Bluetooth, cellular, radio, etc.) link or a wired link. If present, the communications interface 1980 may be in communication with processor 1960, such as to provide a signal to the processor 1960 to activate or deactivate one or more of the vibrotactile devices 1940.

The vibrotactile system 1900 may optionally include other subsystems and components, such as touch-sensitive pads 1990, pressure sensors, motion sensors, position sensors, lighting elements, and/or user interface elements (e.g., an on/off button, a vibration control element, etc.). During use, the vibrotactile devices 1940 may be configured to be activated for a variety of different reasons, such as in response to the user's interaction with user interface elements, a signal from the motion or position sensors, a signal from the touch-sensitive pads 1990, a signal from the pressure sensors, a signal from the other device or system 1970, etc.

Although the power source 1950, the processor 1960, and the communications interface 1980 are illustrated in FIG. 19 as being positioned in the haptic device 1920, the present disclosure is not so limited. For example, one or more of the power source 1950, the processor 1960, or the communications interface 1980 may be positioned within the haptic device 1910 or within another wearable textile.

Figure 20:
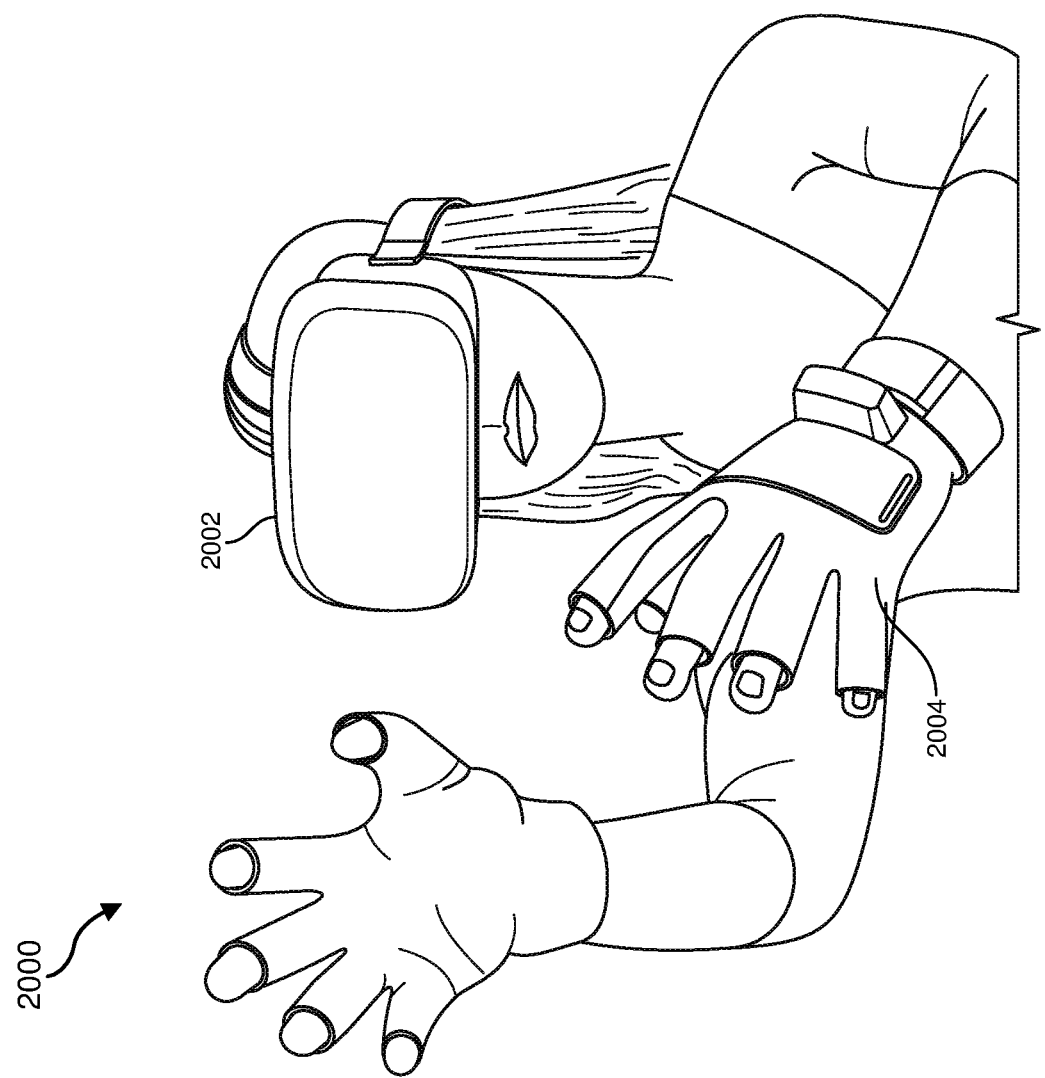
FIG. 20 is an illustration of an example virtual-reality environment according to embodiments of this disclosure.

Haptic wearables, such as those shown in and described in connection with FIG. 19, may be implemented in a variety of types of artificial-reality systems and environments. FIG. 20 shows an example artificial-reality environment 2000 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 18:
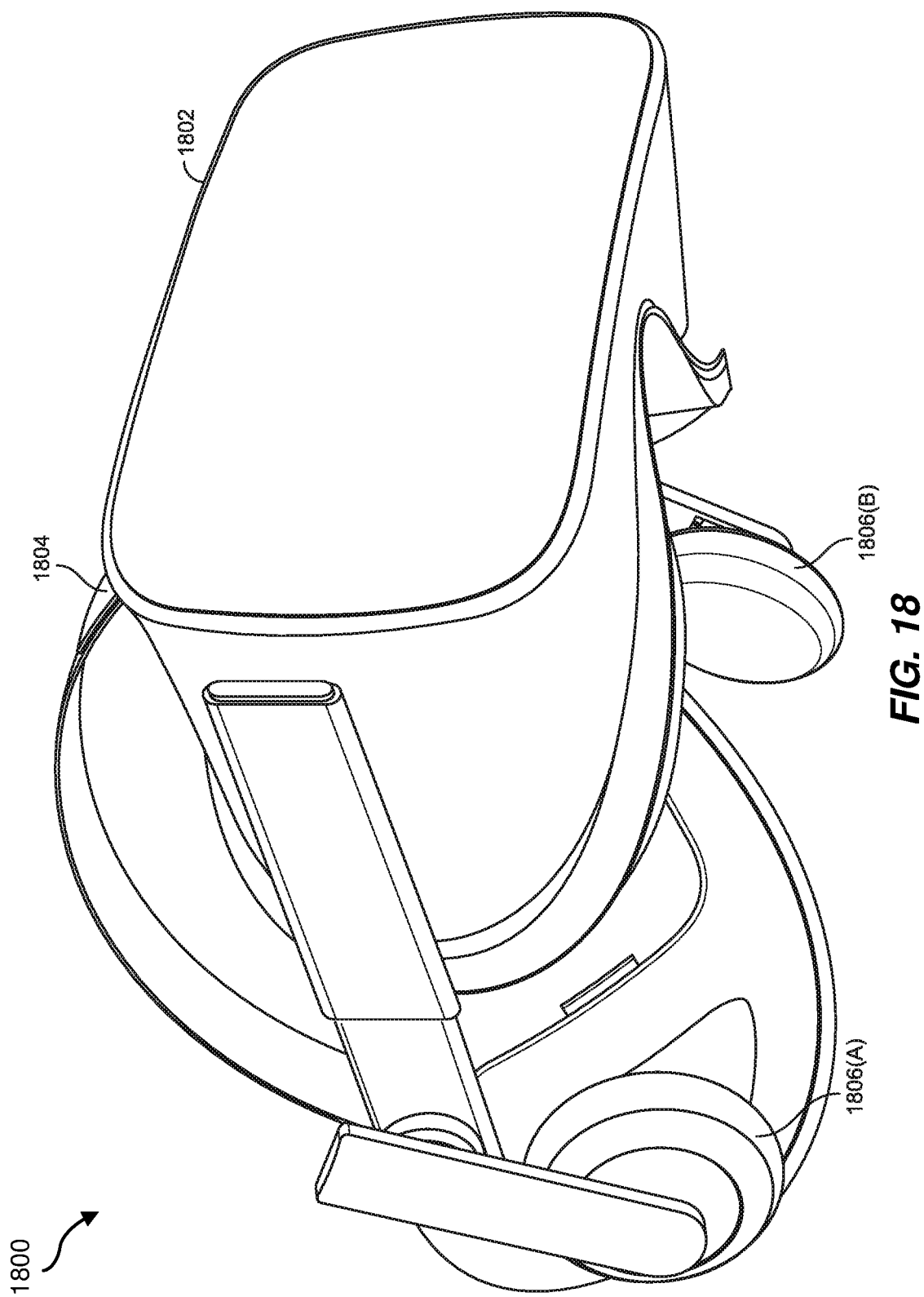
FIG. 18 is an illustration of an example virtual-reality headset that may be used in connection with embodiments of this disclosure.

Head-mounted display 2002 generally represents any type or form of virtual-reality system, such as the virtual-reality system 1800 in FIG. 18. Haptic device 2004 generally represents any type or form of wearable device, worn by a user of an artificial-reality system, that provides haptic feedback to the user to give the user the perception that he or she is physically engaging with a virtual object. In some embodiments, the haptic device 2004 may provide haptic feedback by applying vibration, motion, and/or force to the user. For example, the haptic device 2004 may limit or augment a user's movement. To give a specific example, the haptic device 2004 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use the haptic device 2004 to send action requests to a console. Examples of action requests include, without limitation, requests to start an application and/or end the application and/or requests to perform a particular action within the application.

Figure 21:
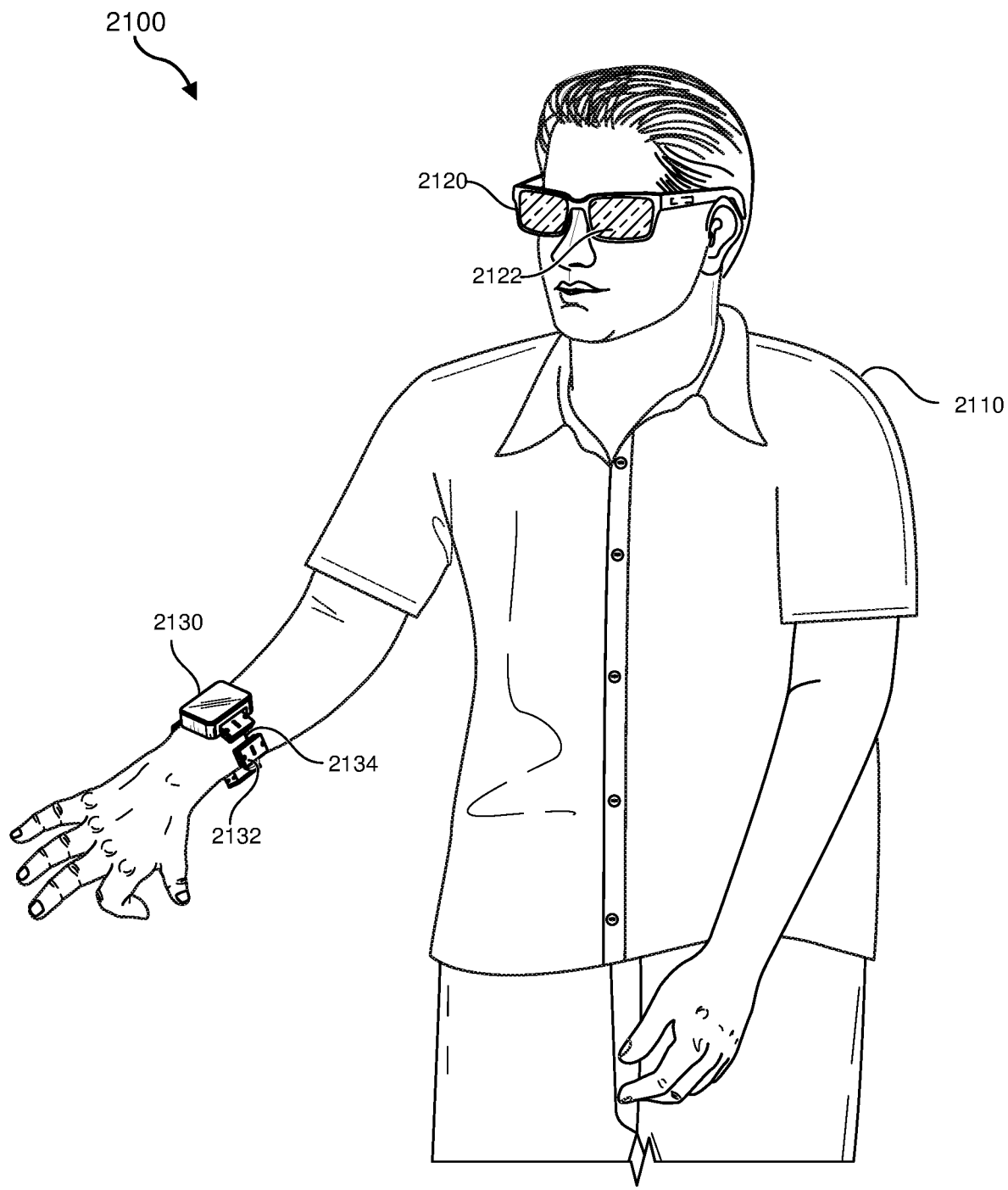
FIG. 21 is an illustration of an example augmented-reality environment according to embodiments of this disclosure.

While haptic interfaces may be used with virtual-reality systems, as shown in FIG. 20, haptic interfaces may also be used with augmented-reality systems, as shown in FIG. 21. FIG. 21 is a perspective view of a user 2110 interacting with an augmented-reality system 2100. In this example, the user 2110 may wear a pair of augmented-reality glasses 2120 that may have one or more displays 2122 and that are paired with a haptic device 2130. In this example, the haptic device 2130 may be a wristband that includes a plurality of band elements 2132 and a tensioning mechanism 2134 that connects band elements 2132 to one another.

One or more of the band elements 2132 may include any type or form of actuator suitable for providing haptic feedback. For example, one or more of the band elements 2132 may be configured to provide one or more of various types of cutaneous feedback, including vibration, force, traction, texture, and/or temperature. To provide such feedback, the band elements 2132 may include one or more of various types of actuators. In one example, each of the band elements 2132 may include a vibrotactor (e.g., a vibrotactile actuator) configured to vibrate in unison or independently to provide one or more of various types of haptic sensations to a user. Alternatively, only a single band element or a subset of band elements may include vibrotactors.

The haptic devices 1910, 1920, 2004, and 2130 may include any suitable number and/or type of haptic transducer, sensor, and/or feedback mechanism. For example, the haptic devices 1910, 1920, 2004, and 2130 may include one or more mechanical transducers, piezoelectric transducers, and/or fluidic transducers. The haptic devices 1910, 1920, 2004, and 2130 may also include various combinations of different types and forms of transducers that work together or independently to enhance a user's artificial-reality experience. In one example, each of the band elements 2132 of the haptic device 2130 may include a vibrotactor (e.g., a vibrotactile actuator) configured to vibrate in unison or independently to provide one or more of various types of haptic sensations to a user.

By way of example and not limitation, the present disclosure includes the following example embodiments.

Example 1: A handheld controller may include at least one finger force-feedback mechanism, which may include a rotational element positioned to have an axis of rotation that is located along a palm side of a finger of an intended user's hand when holding the handheld controller, a proximal linkage element positioned and configured to rotate with the intended user's finger about the major knuckle when the user squeezes the handheld controller, and a distal linkage element positioned and configured to rotate relative to the proximal linkage element with the intended user's finger about the second knuckle when the user squeezes the handheld controller.

Example 2: The handheld controller of Example 1, wherein the rotational element may include at least one of: a motor, a rotary encoder, a brake, or a clutch.

Example 3: The handheld controller of Example 1 or 2, wherein the finger force-feedback mechanism may further include a central housing that supports the rotational element, wherein the proximal linkage element is rotationally coupled to the central housing.

Example 4: The handheld controller of any of Examples 1 through 3, wherein the finger force-feedback mechanism may be configured to exhibit a single degree of rotational freedom, such that rotation of the distal linkage element is codependent with rotation of the proximal linkage element.

Example 5: The handheld controller of any of Examples 1 through 3, wherein the finger force-feedback mechanism is configured to exhibit two degrees of rotational freedom, such that rotation of the distal linkage element is at least partially independent from rotation of the proximal linkage element.

Example 6: The handheld controller of any of Examples 1 through 4, wherein at least one finger force-feedback mechanism may include a rigid bar extending between the proximal linkage element and the distal linkage element to constrain rotation between the proximal linkage element and the distal linkage element.

Example 7: The handheld controller of any of Examples 1 through 6, wherein the at least one finger force-feedback mechanism may include four finger force-feedback mechanisms positioned and configured for respective interaction with four of the intended user's fingers.

Example 8: The handheld controller of any of Examples 1 through 7, which may further include at least one thumb input element positioned for interaction by the intended user's thumb.

Example 9: The handheld controller of any of Examples 1 through 8, wherein the finger force-feedback mechanism may further include at least one elongated force transmission element coupled between the rotational element and the proximal linkage element.

Example 10: The handheld controller of Example 9, wherein the elongated force transmission element may include at least one of: a belt, a cable, a pulley system, a series of rigid links, or a metallic tape.

Example 11: The handheld controller of any of Examples 1 through 10, which may further include at least one gear operably coupled between the rotational element and the proximal linkage element.

Example 12: The handheld controller of any of Examples 1 through 11, wherein the rotational element may include a motor positioned outside of the intended user's grip and a shaft extending into the intended user's grip when holding the handheld controller.

Example 13: The handheld controller of any of Examples 1 through 12, which may further include at least one input button positioned on the distal linkage element in a location to be depressed by the intended user's finger.

Example 14: The handheld controller of any of Examples 1 through 13, which may further include a power and control module operatively coupled to the finger force-feedback mechanism to provide electrical power and computer control to the finger force-feedback mechanism.

Example 15: The handheld controller of Example 14, wherein the power and control module may be operatively connected to the finger force-feedback mechanism via an electrical cord.

Example 16: The handheld controller of Example 14 or 15, wherein the power and control module may include a module housing that is rigidly coupled to the finger force-feedback mechanism.

Example 17: A handheld controller, which may include: a stack of four finger force-feedback mechanisms configured for interaction with four respective fingers of an intended user, each of the finger force-feedback mechanisms including: at least one rotational actuator positioned to be at least partially inside the intended user's hand when holding and squeezing the handheld controller, wherein the rotational actuator includes an actuator housing and a rotary shaft; a proximal linkage element that is rotationally coupled to the actuator housing at a first pivot; a distal linkage element that is rotationally coupled to the proximal linkage element at a second pivot; and at least one force transmission element coupling the rotary shaft to the proximal linkage element.

Example 18: The handheld controller of Example 17, wherein the rotational actuator may ne configured to provide force feedback to the corresponding finger through the force transmission element.

Example 19: The handheld controller of Example 17 or 18, which may further include a rotary encoder positioned and configured to sense a position of at least one of: the proximal linkage element, or the distal linkage element.

Example 20: An artificial-reality system, which may include: a head-mounted display configured to present a computer-generated image of an object to an intended user; and a handheld controller communicatively coupled with the head-mounted display, the handheld controller including: at least one finger force-feedback mechanism, including: a rotational element including a housing and a rotary shaft, wherein at least a portion of the rotary shaft is positioned to be within the intended user's hand when the handheld controller is grasped by the intended user; a proximal linkage element rotationally coupled to the housing of the rotational element; a distal linkage element rotationally coupled to the proximal linkage element; and a force transmission element coupling the rotary shaft to the proximal linkage element, wherein the rotational element is configured to resist inward movement of the intended user's finger through the rotational element and at least the proximal linkage element to provide a physical sensation of interacting with the object.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A handheld controller, comprising:
    at least one finger force-feedback mechanism, comprising:
        a rotational element positioned within a central housing to have an axis of rotation that is located along a palm side of fingers of an intended user's hand and transverse to the fingers of the intended user's hand when holding the handheld controller by the central housing positioned on the palm side of the intended user's hand;
        a proximal linkage element positioned and configured to rotate with the intended user's finger about the major knuckle when the user squeezes the handheld controller; and
        a distal linkage element connected to the proximal linkage element at a pivot point and configured to rotate about the pivot point relative to the proximal linkage element with the intended user's finger about the second knuckle when the user squeezes the handheld controller.

2. The handheld controller of claim 1, wherein the rotational element comprises at least one of:
    a motor;
    a rotary encoder;
    a brake; or
    a clutch.

3. The handheld controller of claim 1, wherein the proximal linkage element is rotationally coupled to the central housing.

4. The handheld controller of claim 1, wherein the finger force-feedback mechanism is configured to exhibit a single degree of rotational freedom, such that rotation of the distal linkage element is codependent with rotation of the proximal linkage element.

5. The handheld controller of claim 1, wherein the finger force-feedback mechanism is configured to exhibit two degrees of rotational freedom, such that rotation of the distal linkage element is at least partially independent from rotation of the proximal linkage element.

6. The handheld controller of claim 1, wherein the at least one finger force-feedback mechanism comprises a rigid bar extending between the proximal linkage element and the distal linkage element to constrain rotation between the proximal linkage element and the distal linkage element.

7. The handheld controller of claim 1, wherein the at least one finger force-feedback mechanism comprises four finger force-feedback mechanisms positioned and configured for respective interaction with four of the intended user's fingers.

8. The handheld controller of claim 1, further comprising at least one thumb input element positioned for interaction by the intended user's thumb.

9. The handheld controller of claim 1, wherein the finger force-feedback mechanism further comprises at least one elongated force transmission element coupled between the rotational element and the proximal linkage element.

10. The handheld controller of claim 9, wherein the elongated force transmission element comprises at least one of:
a belt;
a cable;
a pulley system;
a series of rigid links; or
a metallic tape.

11. The handheld controller of claim 1, further comprising at least one gear operably coupled between the rotational element and the proximal linkage element.

12. The handheld controller of claim 1, wherein the rotational element further comprises a motor positioned outside of the intended user's grip and a shaft extending into the intended user's grip when holding the handheld controller.

13. The handheld controller of claim 1, further comprising at least one input button positioned on the distal linkage element in a location to be depressed by the intended user's finger.

14. The handheld controller of claim 1, further comprising a power and control module operatively coupled to the finger force-feedback mechanism to provide electrical power and computer control to the finger force-feedback mechanism.

15. The handheld controller of claim 14, wherein the power and control module is operatively connected to the finger force-feedback mechanism via an electrical cord.

16. The handheld controller of claim 14, wherein the power and control module comprises a module housing that is rigidly coupled to the finger force-feedback mechanism.

17. The handheld controller of claim 1, wherein the at least one finger force-feedback mechanism comprises a plurality of finger force-feedback mechanisms each comprising a respective rotational element, proximal linkage element, and distal linkage element, wherein the axis of rotation of each rotational element of the plurality of finger force-feedback mechanisms is parallel to or collinear with each other axis of rotation of the rotational elements of the plurality of finger force-feedback mechanisms.

* * * * *